United States Patent
Hur et al.

(10) Patent No.: US 9,672,168 B2
(45) Date of Patent: Jun. 6, 2017

(54) SYSTEM INTERCONNECTION OF SYSTEM-ON-CHIP

(71) Applicant: Samsung Electronics Co., Ltd., Suwon-si (KR)

(72) Inventors: Jae-Young Hur, Hwaseong-si (KR); Hyun-Joon Kang, Hwasung (KR); Sung-Min Hong, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 331 days.

(21) Appl. No.: 14/320,993

(22) Filed: Jul. 1, 2014

(65) Prior Publication Data

US 2015/0039795 A1   Feb. 5, 2015

(30) Foreign Application Priority Data

Jul. 31, 2013   (KR) .................. 10-2013-0090989

(51) Int. Cl.
*G06F 13/36* (2006.01)
*G06F 13/16* (2006.01)
*G06F 13/40* (2006.01)

(52) U.S. Cl.
CPC ...... *G06F 13/1621* (2013.01); *G06F 13/4022* (2013.01); *G06F 13/4059* (2013.01)

(58) Field of Classification Search
USPC .................. 710/104–110, 111–125, 306–317
See application file for complete search history.

(56) References Cited

U.S. PATENT DOCUMENTS

| | | | |
|---|---|---|---|
| 7,400,638 B2 | 7/2008 | Keirouz et al. | |
| 8,819,322 B2* | 8/2014 | Yun ..................... | G06F 13/1657 710/105 |
| 8,886,861 B2* | 11/2014 | Kwon ................. | G06F 13/4022 710/110 |
| 2012/0159037 A1 | 6/2012 | Kwon et al. | |

OTHER PUBLICATIONS

ARM, AMBA AXI and ACE Protocol Specification, AXI3, AXI4, and AXI4-Lite; ACE and ACE-Lite, ARM IHI 0022D (ID102711), pp. 1-306.
Dmitry V. Ponomarev, Dissertation, Submitted in partial fulfillment of the requirements for the degree of Doctor of Philosophy in Computer Science in the Graduate School of Binghamton University State University of New York May, 2003, Dynamic Optimizations of Superscalar Processors for Energy Efficiency, pp. 1-199.

* cited by examiner

*Primary Examiner* — Raymond Phan
(74) *Attorney, Agent, or Firm* — ONELLO & MELLO LLP

(57) ABSTRACT

Provided is a method of driving a system-on-chip (SOC). The method includes adding a first transaction to a list, allocating the first transaction to a first slot, determining whether a second transaction is redundant, and adding the second transaction to the list and allocating the second transaction to the first slot when it is determined that the second transaction is redundant. Accordingly, the SOC can increase outstanding capability and enhance performance of a system interconnection.

20 Claims, 36 Drawing Sheets

| Transaction order | T1 | T2 | T3 | T4 | T5 | T6 |
|---|---|---|---|---|---|---|
| Burst length | 16 | 8 | 1 | 4 | 1 | 1 |
| ID | A | A | A | A | A | A |

| slot | Transaction | ID | Slave | Occupy | Request order |
|---|---|---|---|---|---|
| 1 | T1 | A | 2 | 1 | 1 |
| 2 | T2 | A | 2 | 1 | 2 |
| 3 | T3 | A | 1 | 1 | 3 |
| 4 | T4 | A | 2 | 1 | 4 |
| 5 | T5 | A | 1 | 1 | 5 |
| 6 | T6 | A | 1 | 1 | 6 |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | |
| 16 | | | | | |

| slot | Transaction | ID | Slave | Occupy | Request order | Allocated beat counts |
|---|---|---|---|---|---|---|
| 1 | T1 | A | 2 | 1 | 1 | 16 |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |
| 16 | | | | | | |

| slot | Transaction | ID | Slave | Occupy | Request order | Allocated beat counts |
|---|---|---|---|---|---|---|
| 1 | T1 | A | 2 | 1 | 1 | 16 |
| 2 | T2 | A | 2 | 1 | 2 | 12 |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |
| 16 | | | | | | |

| slot | Transaction | ID | Slave | Occupy | Request order | Allocated beat counts |
|------|-------------|----|-------|--------|---------------|----------------------|
| 1 | T1 | A | 2 | 1 | 1 | 16 |
| 2 | T2 | A | 2 | 1 | 2 | 12 |
| 3 | T3 | A | 1 | 1 | 3 | 3 |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |
| 16 | | | | | | |

| slot | Transaction | ID | Slave | Occupy | Request order | Allocated beat counts |
|---|---|---|---|---|---|---|
| 1 | T1 | A | 2 | 1 | 1 | 16 |
| 2 | T2, T4 | A | 2 | 1 | 2,4 | 12 |
| 3 | T3 | A | 1 | 1 | 3 | 3 |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |
| 16 | | | | | | |

| slot | Transaction | ID | Slave | Occupy | Request order | Allocated beat counts |
|------|-------------|----|----|-----|------|-------|
| 1 | T1 | A | 2 | 1 | 1 | 16 |
| 2 | T2, T4 | A | 2 | 1 | 2,4 | 12 |
| 3 | T3, T5 | A | 1 | 1 | 3, 5 | 3 |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |
| 16 | | | | | | |

| slot | Transaction | ID | Slave | Occupy | Request order | Allocated beat counts |
|------|-------------|----|----|----|----|----|
| 1 | T1 | A | 2 | 1 | 1 | 16 |
| 2 | T2, T4 | A | 2 | 1 | 2,4 | 12 |
| 3 | T3, T5, T6 | A | 1 | 1 | 3, 5, 6 | 3 |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |
| 16 | | | | | | |

| Transaction order | T1 | T2 | T3 | T4 | T5 | T6 |
|---|---|---|---|---|---|---|
| Burst length | 1 | 1 | 16 | 16 | 16 | 16 |
| ID | A | B | B | B | B | B |

| Transaction order | T1 | T2 | T3 | T4 | T5 | T6 | T7 |
|---|---|---|---|---|---|---|---|
| Burst length | 16 | 8 | 1 | 4 | 1 | 1 | 5 |
| ID | A | A | A | A | A | A | A |

| slot | Transaction | ID | Slave | Occupy | Request order | Allocated beat counts |
|---|---|---|---|---|---|---|
| 1 | T1 | A | 2 | 1 | 1 | 16 |
| 2 | T2, T4, T7(1-4) | A | 2 | 1 | 2, 4 | 16 |
| 3 | T3, T5, T6 | A | 1 | 1 | 3, 5, 6 | 3 |
| 4 | T7(5) | A | 2 | 1 | 7 | 1 |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |
| 16 | | | | | | |

| slot1 | T1 |
| slot2 | T2 | T4 | T7(1-4) |
| slot3 | T3 T5 T6 |
| slot4 | T7(5) |
| slot5 | |
| slot6 | |
| slot7 | |
| slot8 | |
| slot9 | |
| slot10 | |
| slot11 | |
| slot12 | |
| slot13 | |
| slot14 | |
| slot15 | |
| slot16 | |

SYSTEM INTERCONNECTION OF SYSTEM-ON-CHIP

CROSS-REFERENCE TO RELATED APPLICATION

This application claims priority under 35 U.S.C. §119 to Korean Patent Application No. 10-2013-0090989 filed on Jul. 31, 2013, the disclosure of which is hereby incorporated by reference in its entirety.

BACKGROUND

1. Field

Embodiments of the inventive concept relate to a system interconnection, and more particularly, to a system interconnection capable of allocating a plurality of outstanding transactions to a single slot, a system-on-chip (SOC) including the system interconnection, and/or a method of driving a SOC.

2. Description of Related Art

A system-on-chip (SOC) technique is a semiconductor technique of combining conventional complicated systems under a single chip. Techniques for realizing SOCs have been studied and considered. In particular, a method of connecting intellectual properties (IPs) embedded in a chip has become considerably critical.

In general, an SOC includes a processor configured to control an entire system and various IPs controlled by the processor. The IPs may be classified into a slave IP, which may be always under control of the processor, and a master IP capable of requesting data communications from other slave IPs. In some embodiments, a single IP may serve as both a slave IP and a master IP.

As bus standard protocols for connecting and managing IPs of SOCs evolve and grow in popularity, there are available an Advanced Microcontroller Bus Architecture (AMBA) by ARM, Ltd. and a SONIC's Open Core Protocol (OCP). AMBA's bus types include Advanced High-Performance Bus (AHB), Advanced Peripheral Bus (APB), and Advanced eXtensible Interface (AXI).

Among these, AMBA and AXI protocols may be bus protocols, which may be appropriate for high-speed/high-performance systems as compared with a conventional on-chip bus protocol. According to the AMBA and AXI protocols, channels related to a read operation, a write operation, and a write response may be separated from one another and independently operate. Also, the AMBA and AXI protocols may have transaction characteristics, such as multiple-outstanding addresses and write data interleaving.

SUMMARY

Embodiments of the inventive concept provide a system interconnection capable of storing a plurality of outstanding transactions in one slot of a slot array.

Other embodiments of the inventive concept provide a system-on-chip (SOC) including the system interconnection.

Other embodiments of the inventive concept provide a method of driving an SOC, by which responses may be transmitted in the request order.

In accordance with an aspect of the inventive concept, a system interconnection includes a slot array including a first slot, and a slot manager configured to add a first transaction to a list, allocate the first transaction to the first slot, add a second transaction to the list in response to a determination that the second transaction is redundant, and allocate the second transaction to the first slot.

In some embodiments, in response to a determination that the second transaction is redundant, the first and second transactions are determined to have the same transaction identification (ID) and the same direction, and a slot length of the first slot is greater than or equal to the sum of burst lengths of the first and second transactions.

In some embodiments, the first slot stores data corresponding to each of the first and second transactions.

In some embodiments, in response to the second transaction not being redundant, the second transaction is allocated to a second slot included in the slot array.

In some embodiments, the first slot stores data corresponding to the first transaction, and the second slot stores data corresponding to the second transaction.

In some embodiments, the list stores properties of each of the first and second transactions, and wherein the properties of the each of the first and second transactions include a transaction ID, direction information, an occupation, a request order, and allocated beat counts.

In some embodiments, the list is embodied as a linked-list.

In some embodiments, each of the first and second transactions includes an outstanding transaction. The outstanding transaction is issued after a master requests a request and until the master receives a response to the request.

In some embodiments, the slot array includes a global queue configured to store the request order of the first and second transactions.

In some embodiments, the global queue includes a pointer configured to point at the oldest transaction.

In accordance with another aspect of the inventive concept, an SOC includes a master and a slave, and a system interconnection configured to connect the master and the slave. The system interconnection includes a slot array including a first slot, and a slot manager configured to add a first transaction to a list, allocate the first transaction to the first slot, add a second transaction to the list in response to a determination that the second transaction is redundant, and allocate the second transaction to the first slot.

In some embodiments, in response to the determination that the second transaction is redundant, the first and second transactions have the same transaction ID and the same direction, and a slot length of the first slot is greater than or equal to the sum of burst lengths of the first and second transactions. The first slot stores data corresponding to each of the first and second transactions.

In some embodiments, in response to a determination that the second transaction is not redundant, the second transaction is allocated to a second slot included in the slot array. The first slot stores data corresponding to the first transaction, and the second slot stores data corresponding to the second transaction.

In some embodiments, in response to a determination that there is no slot to allocate transactions, the system interconnection is in a deadlock state.

In some embodiments, the slot manager is constructed and arranged to allocate a larger number of transactions than a number of first slots or second slots.

In some embodiments, each of the first and second transactions includes a request made by the master and a response made by the slave.

In some embodiments, the slot array includes a global queue configured to store request orders of the first and second transactions. The global queue includes a pointer configured to point at the oldest transaction.

In accordance with still another aspect of the inventive concept, a method of driving an SOC includes adding a first transaction to a list and allocating the first transaction to a first slot, determining whether a second transaction is redundant, and adding the second transaction to the list and allocating the second transaction to the first slot in response to a determination that the second transaction is redundant.

In some embodiments, the allocation of the first transaction to the first slot includes storing data corresponding to the first transaction in the first slot.

In some embodiments, the determination of whether the second transaction is redundant includes determining whether the first and second transactions have the same transaction ID and the same direction, and determining whether a slot length of the first slot is greater than or equal to the sum of burst lengths of the first and second transactions.

In some embodiments, the allocation of the second transaction to the first slot include storing data corresponding to each of the first and second transactions in the first slot.

In some embodiments, the method further includes allocating the second transaction to a second slot of the slot array in response to a determination that the second transaction is not redundant.

In some embodiments, the allocation of the second transaction to the second slot includes storing data corresponding to the second transaction in the second slot.

In accordance with yet another aspect of the inventive concept, a method of driving an SOC is provided. The SOC includes a slot array including a first slot and a second slot and a slot manager configured to manage the slot array. The method of driving the SOC includes storing a request order of a first transaction and allocating the first transaction to the first slot, storing a request order of a second transaction, allocating the second transaction to the first slot when the second transaction is redundant, and allocating the second transaction to the second slot when the second transaction is not redundant, and firstly processing any one of the first transaction and the second transaction based on the request order of the first transaction and the request order of the second transaction.

In accordance with yet another aspect of the inventive concept, an SOC includes a slot array including a first slot and a second slot, and a slot manager configured to manage the slot array, allocate a first transaction to the first slot, and allocate a second transaction to a free space of the first slot and the second slot when the second transaction has the same transaction ID and the same direction as the first transaction and the second transaction cannot be allocated to the free space of the first slot. The second slot is a new free slot or stores only data corresponding to a transaction having the same transaction ID and the same direction as the second transaction.

In accordance with yet another aspect of the inventive concept, a system interconnection of a system on chip (SOC) comprises a first connector for communicating with at least one master of the SOC, a second connector for communicating with at least one slave of the SOC, a slot array including a plurality of slots, and a slot manager configured to allocate a plurality of transactions to each slot of the plurality of slots in the slot array. The slot manager includes a list configured to correspond to the slots, and is further configured to store the transactions and properties thereof.

The slot manager is configured to control data to be transmitted to the at least one master according to the order of the transactions.

In some embodiments, the slot manager is configured to add a first transaction to a list, allocate the first transaction to a first slot of the plurality of slots, add a second transaction to the list in response to a determination that the second transaction is redundant, and allocate the second transaction to the first slot.

In some embodiments, in response to a determination that the second transaction is redundant, the first and second transactions are determined to have the same transaction identification (ID) and the same direction, and a slot length of the first slot is greater than or equal to the sum of burst lengths of the first and second transactions.

In some embodiments, in response to a determination of the second transaction not redundant, the second transaction is allocated to a second slot included in the slot array.

In some embodiments, the first slot stores data corresponding to the first transaction, and the second slot stores data corresponding to the second transaction.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings:

FIG. 5C illustrates a list to which the transactions shown in FIG. 5B may be added;

FIGS. 6A through 6F are conceptual diagrams illustrating operations of a system interconnection according to an embodiment of the inventive concept;

FIG. 14C illustrates a list to which one or more transactions of FIG. 14B are added;

FIG. 15 is a conceptual diagram of a slot array corresponding to the list shown in FIG. 14C;

DETAILED DESCRIPTION OF THE EMBODIMENTS

Figure 1:
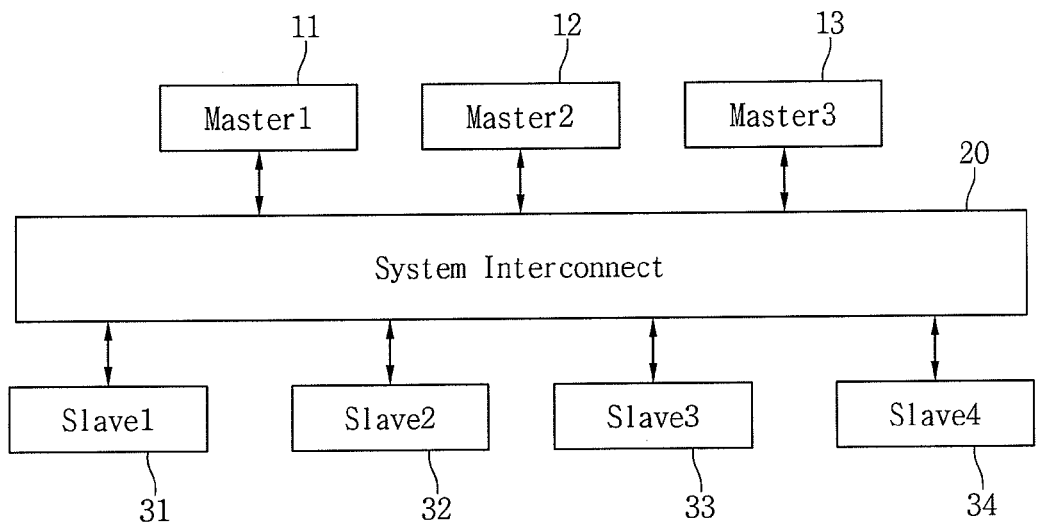
FIG. 1 is a block diagram of a system-on-chip (SOC) according to embodiments of the inventive concept.

While example embodiments of the present invention are disclosed herein, their specific structural and functional details are merely examples taken for descriptive purposes only. The present invention may be embodied in many alternate forms and should not be construed as limited to example embodiments set forth herein.

Accordingly, while the invention is susceptible to various modifications and may take on various alternative forms, specific embodiments thereof are shown by way of example in the drawings and will herein be described in detail. It should be understood, however, that there is no intent to limit the invention to the particular forms disclosed. On the contrary, the invention is to cover all modifications, equivalents, and alternatives falling within the spirit and scope of the claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of order noted in the flowcharts. For example, two blocks shown in succession may in fact be executed substantially concurrently or the blocks may sometimes be executed in reverse order, depending upon the functionality/acts involved.

The inventive concept will now be described more fully with reference to the accompanying drawings, in which embodiments of the inventive concept are shown.

A system interconnection according to a first embodiment of the inventive concept may include a plurality of transactions disposed in each of slots of a slot array. The system interconnection according to the first embodiment and a method of driving the same are described with reference to FIGS. 5 through 8.

A system interconnection according to a second embodiment of the inventive concept may include a global queue including information regarding the order of transactions. A slot manager may control data to be transmitted to a master according to the order of the transactions. The system interconnection according to the second embodiment and a method of driving the same are described with reference to FIGS. 9 through 13B.

An SOC according to a third embodiment of the inventive concept may include the system interconnection according to the first embodiment.

An SOC according to a fourth embodiment of the inventive concept may include the system interconnection according to the second embodiment.

A method of driving an SOC according to a fifth embodiment of the inventive concept may include adding a first transaction to a list, allocating the first transaction to a first slot, determining whether or not a second transaction is redundant, adding the second transaction to the list in response to a determination that the second transaction is redundant, and allocating the second transaction to the first slot. The method of driving the SOC according to the fifth embodiment is described with reference to FIG. 8.

A method of driving an SOC according to a sixth embodiment of the inventive concept may include storing the request order of each of a plurality of transactions, allocating each of the plurality of transactions to each of a plurality of slots, and indicating the oldest transaction with reference to the request order. The method of driving the SOC according to the sixth embodiment is described with reference to FIGS. 13A and 13B.

An SOC according to a seventh embodiment of the inventive concept may include a slot array including first and second slots and a slot manager configured to manage the slot array, allocate a first transaction to the first slot, and allocate the second transaction to a free space of the first slot and the second slot when the second transaction has the same transaction ID and the same direction as the first transaction and the second transaction cannot be allocated to the free space of the first slot. A method of driving the SOC according to the seventh embodiment is described with reference to FIGS. 14A and 15.

FIG. 1 is a block diagram of an SOC 100 according to embodiments of the inventive concept.

The SOC 100 may include first through third masters 11 to 13, a system interconnection 20, and first through fourth slaves 31 to 34.

Each of the first through third masters 11 to 13 and the first through fourth slaves 31 to 34 may communicate signals with each other and/or to other elements internal and/or external to the SOC 100 using a read or write transaction. For example, during operations of the SOC 100, each of the first through third masters 11 to 13 may control a generation of an address signal and/or a control signal applied to the system interconnection 20. Also, each of the first through fourth slaves 31 to 34 may operate in response to an address signal and a control signal generated by the first through third masters 11 to 13.

Each of the first through third masters 11 to 13 may include a central processing unit (CPU), a direct memory access (DMA), and/or a 3-dimensional graphic accelerator. Also, each of the first through fourth slaves 31 to 34 may include at least one of a memory controller and a special function register (SFR).

In general, a system bus may be structured such that a plurality of masters and a plurality of slaves are connected to one bus line. Accordingly, while one master is accessing one slave, other masters may be in a standby state until the corresponding master finishes using the system bus.

In contrast, the SOC 100 according to the embodiments of the inventive concept may be structured such that each of a plurality of masters 11-13 is capable of simultaneously accessing each of a plurality of slaves 31-34. To achieve this, the system interconnection 20 may include a bus matrix structure having a plurality of channels. The system interconnection 20 may include connectors for communicating with the masters 11-13 and the slaves 31-34. The system interconnection 20 may simultaneously connect each of the masters and/or slaves to each of the plurality of channels using a multiplexer and a demultiplexer. Accordingly, each of the plurality of masters may simultaneously access each of different slaves using the system interconnection 20. For example, a first master 11 may access a first slave 31 through the system interconnection 20 and simultaneously, a second master 12 may access a second slave 32 via the connectors of the system interconnection 20.

Figure 2:
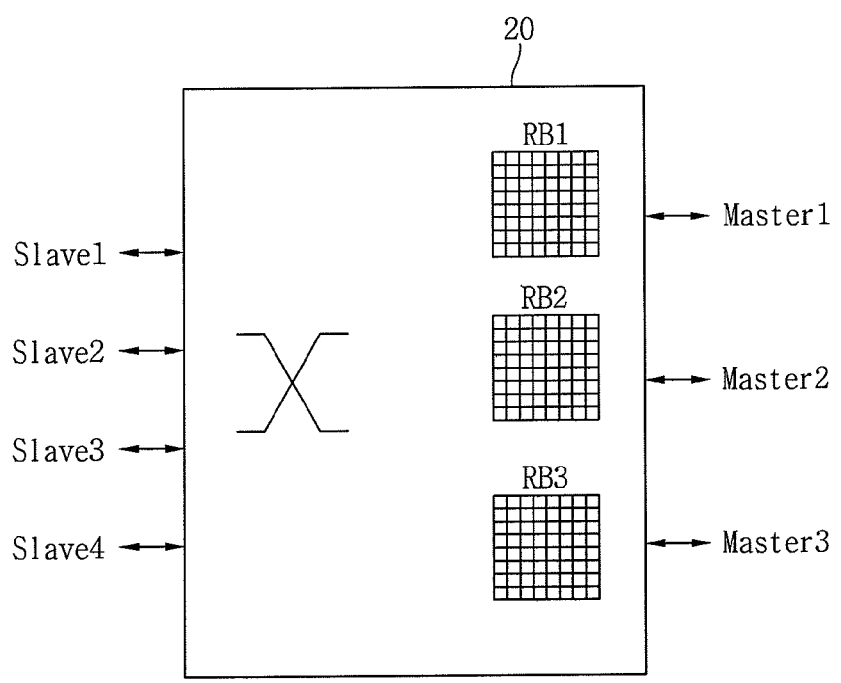
FIG. 2 is a detailed conceptual diagram of a system interconnection shown in FIG. 1.

FIG. 2 is a detailed conceptual diagram of the system interconnection 20 shown in FIG. 1.

Referring to FIG. 2, the system interconnection 20 according to the embodiments of the inventive concept may include a first reorder buffer RB1 corresponding to the first master 11, a second reorder buffer RB2 corresponding to the second master 12, and a third reorder buffer RB3 corresponding to the third master 13. Although FIG. 2 illustrates an example in which the system interconnection 20 includes a plurality of reorder buffers in equal number with respect to the number of the masters, the system interconnection 20 may include only one reorder buffer.

The first master 11 may access each of the first through fourth slaves 31 to 34 based on the first reorder buffer RB1. The second master 12 may access each of the first through fourth slaves 31 to 34 based on the second reorder buffer RB2. The third master 13 may access each of the first through fourth slaves 31 to 34 based on the third reorder buffer RB3. An example of a reorder buffer according to embodiments of the inventive concept is described in detail with reference to FIG. 3.

Figure 3:
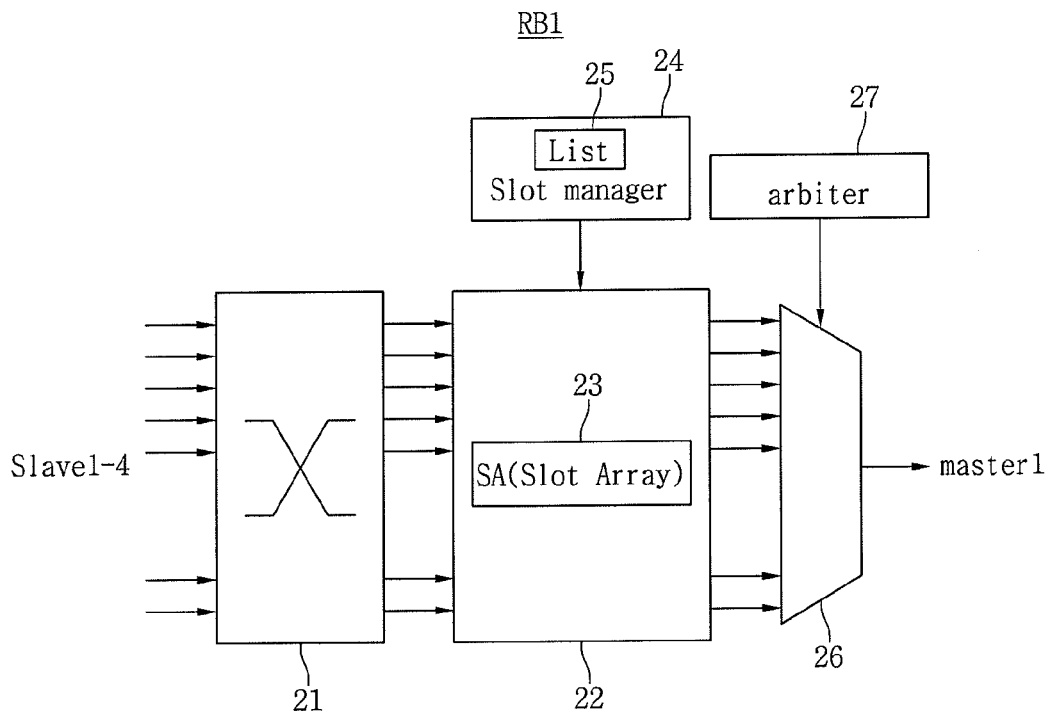
FIG. 3 is a detailed block diagram of a first reorder buffer RB1 shown in FIG. 2.

FIG. 3 is a detailed block diagram of the first reorder buffer RB1 shown in FIG. 2.

Referring to FIG. 3, the first reorder buffer RB1 may include a switch 21, a buffer 22 configured to store data received from the switch 21, a slot manager 24 configured to control the buffer 22, a multiplexer 26, and an arbiter 27 configured to control the multiplexer 26.

The switch 21 may electrically connect the first through fourth slaves 31 to 34 with the buffer 22. The buffer 22 may include a slot array 23 that may be configured to temporarily store data upon a request of a master. The number of slots included in the slot array 23 may depend on a depth or related characteristics of the buffer 22. The slot array 23 according to embodiments of the inventive concept may include a plurality of slots, for example, 16 slots. The slot array 23 is described in detail with reference to FIG. 5D.

The slot manager 24 may include a list 25 that is configured to store properties of a transaction. The properties of the transaction may include but not be limited to a transaction identification (ID), slave information, occupation, request order, and allocated beat counts. In some embodiments, the list 25 according to embodiments of the inventive concept may be embodied as a linked-list. The list 25 according to the embodiments of the inventive concept is described with reference to FIGS. 6A through 6F.

A beat refers to one data transfer transmitted for one cycle. A beat count (i.e., the number of beats) may correspond to a burst length. For example, when four pieces of data are accessed for four cycles during one transaction, the beat count may be 4.

When a new transaction occurs, the slot manager 24 may add the new transaction to the list 25, and control the buffer 22 so that a slot can be allocated for storing data corresponding to the new transaction. The multiplexer 26 may output any one or more outputs of the buffer 22 in response to a control of the arbiter 27.

In addition, although the second and third reorder buffers RB2 and RB3 are not shown, each of the second and third reorder buffers RB2 and RB3 may have the same structure as the first reorder buffer RB1.

Figure 4:
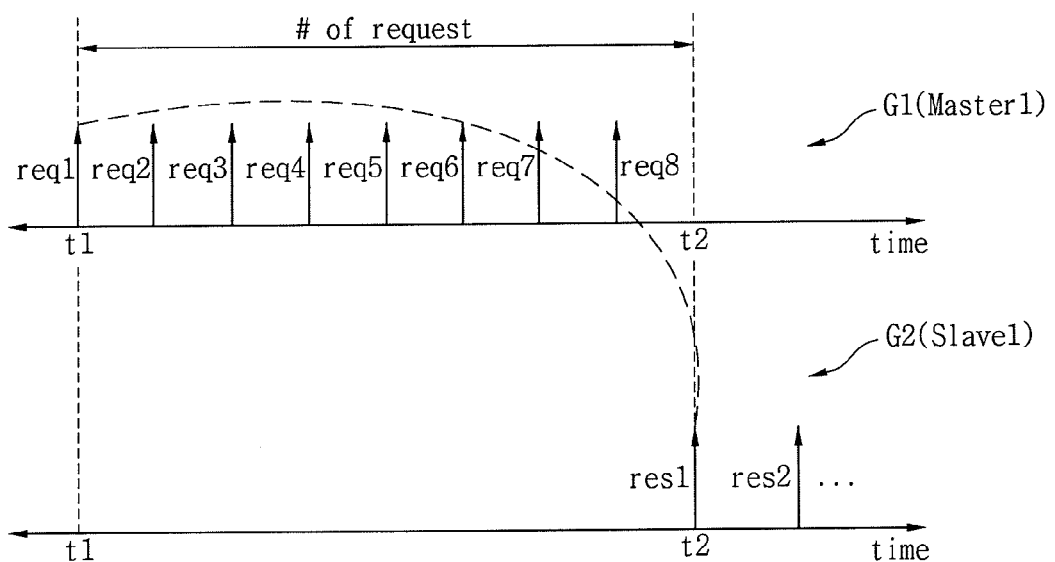
FIG. 4 is a conceptual diagram of an outstanding transaction.

FIG. 4 is a conceptual diagram for describing an outstanding transaction.

Referring to FIGS. 1 and 4, first curve G1 shows a request of the first master 11 over time, and second curve G2 shows a response of the first slave 31 over time.

At a time point t1, a first master 11 may make a first request req1 from a first slave 31 via the system interconnection 20. At a time point t2, the first slave 31 may transmit a first response res1 corresponding to the first request req1 to the first master 11 via the system interconnection 20.

From the time point t1 to the time point t2, the first master 11 may make other requests, e.g., a second request req2, a third request req3, and so on.

An outstanding transaction can refer to requests made by the first master 11 from the time point t1 to the time point t2, i.e., after the first master 11 makes the first request req1 and until the first master 11 receives the first response rest to the first request req1. For example, the outstanding transaction refers to first through eighth requests req1 to req8.

An outstanding capability can refer to the number of requests made by the first master 11 from the time point t1 to the time point t2, i.e., after the first master 11 makes the first request req1 and at any time until the first master 11 receives the first response res1 to the first request req1.

Figures 5A, 5B:
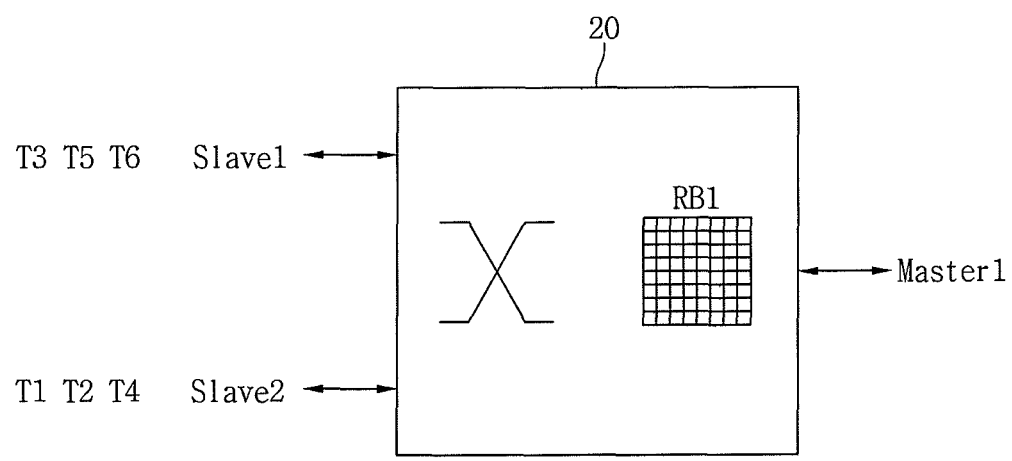
FIG. 5A is a conceptual diagram illustrating one or more operations of a reorder buffer.
FIG. 5B illustrates a table showing properties of first through sixth transactions shown in FIG. 5A.

FIG. 5A is a conceptual diagram illustrating one or more operations of a reorder buffer.

Referring to FIG. 5A, the first master 11 may access the first or second slave 31 or 32 based on the first reorder buffer RB1. For example, during third, fifth, and sixth transactions T3, T5, and T6, the first master 11 may access the first slave 31 based on the first reorder buffer RB1. Also, during first, second, and fourth transactions T1, T2, and T4, the first master 11 may access the second slave 32 based on the first reorder buffer RB1.

FIG. 5B illustrates a table showing properties of the first through sixth transactions T1 to T6 shown in FIG. 5A.

Referring to FIG. 5B, the first transaction T1 through the sixth transaction T6 may be executed in a predetermined order. Also, the first through sixth transactions T1 to T6 may have the same transaction ID, e.g., each transaction ID having a value A. The first transaction T1 may have a burst length of 16. The second transaction T2 may have a burst length of 8. The third transaction T3 may have a burst length of 1. The fourth transaction T4 may have a burst length of 4. The fifth transaction T5 may have a burst length of 1. The sixth transaction T6 may have a burst length of 1.

FIG. 5C illustrates a list to which the transactions shown in FIG. 5B are added.

Referring to FIGS. 5A through 5C, it is assumed that outstanding transactions according to embodiments of the inventive concept are executed in a particular and predetermined order. For example, the respective first through sixth transactions T1 to T6 may be sequentially executed and sequentially ended. Accordingly, the execution of the first through sixth transactions T1 to T6 out of this order may not be considered.

In some embodiments, the list 25 may be configured to correspond to 16 slots (slot1 to slot16). The list 25 may include a transaction ID, slave information, occupation, request order, and allocated beat counts of each of the first through sixth transactions T1 to T6. For example, the transaction ID of each of the first through sixth transactions T1 to T6 may have a value A. The first transaction T1 may include data allowing the first master 11 to access the second slave 32. The second transaction T2 may include data allowing the first master 11 to access the second slave 32. The third transaction T3 may include data allowing the first master 11 to access the first slave 31. The fourth transaction T4 may include data allowing the first master 11 to access the second slave 32. The fifth transaction T5 may include data allowing the first master 11 to access the first slave 31. The sixth transaction T6 may include data allowing the first master 11 to access the first slave 31. Also, the first through sixth transactions T1 to T6 may be requested in a sequential order.

Figure 5D:
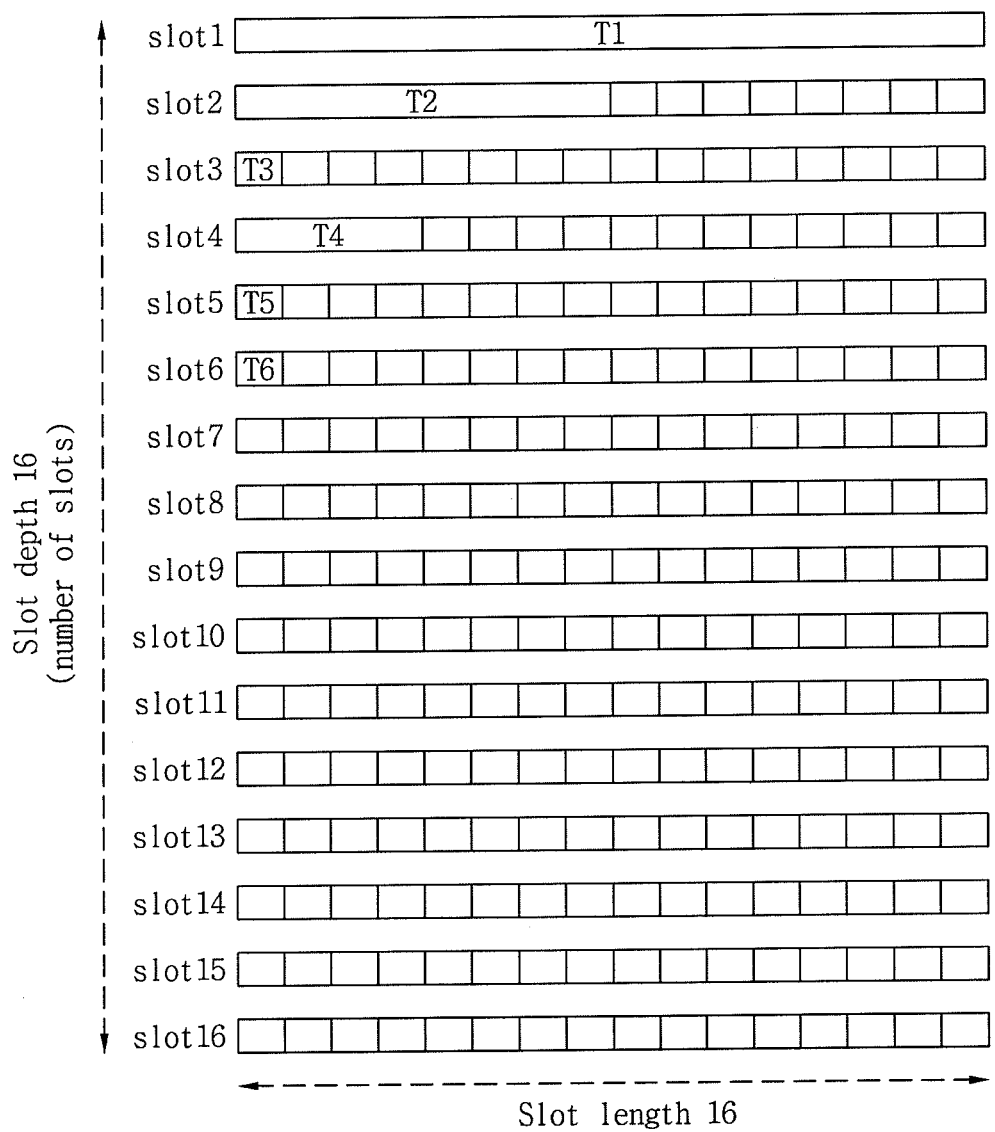
FIG. 5D is a conceptual diagram of a slot array corresponding to the list shown in FIG. 5C.

FIG. 5D is a conceptual diagram of a slot array corresponding to the list shown in FIG. 5C.

Referring to FIGS. 1, 5C, and 5D, each of the slots slot1 to slot16 included in the slot array 23 according to embodiments of the inventive concept may correspond to the list 25. Accordingly, the slot array 23 may include 16 slots (slot1 to slot16).

In addition, the slot array 23 may store first through sixth transactions T1 to T6. Specifically, data corresponding to the first transaction T1 may be stored in the first slot slot1. Data corresponding to the second transaction T2 may be stored in the second slot slot2. Data corresponding to the third transaction T3 may be stored in the third slot slot3. Data corresponding to the fourth transaction T4 may be stored in the fourth slot slot4. Data corresponding to the fifth transaction T5 may be stored in the fifth slot slot5. Data corresponding to the sixth transaction T6 may be stored in the sixth slot slot6.

In some embodiments, the slot array 23 may be configured to include 16 slots or more. However, as the number of slots increases, the number of registers constituting the slot array 23 may increase, or the size of a static random access memory (SRAM) may increase.

An outstanding capability of the system may be limited in the number of slots. This is because a reorder buffer includes a larger number of outstanding transactions with a rise in the number of slots. Accordingly, it may be concluded that as outstanding capability increases, the SOC 100 has higher performance. To increase the outstanding capability, it may be necessary to increase the number of slots included in the slot array 23. However, when the number of the slots included in the slot array 23 is increased, an increase in hardware size of the SOC 100 may be required.

To solve this problem, the SOC 100 according to a first embodiment of the inventive concept may include a plurality of transactions in each of the slots of the slot array 23. That is, one or more transactions may have the same transaction ID, respectively, and may access the same slave, so that each of the slots can be configured to include the transactions. Also, each of the slots may include a sufficient free space for storing a new transaction so that each of the slots can be configured to include the transactions.

FIGS. 6A through 6F are conceptual diagrams illustrating operations of a system interconnection according to embodiments of the inventive concept.

Referring to FIGS. 5A, 5B, and 6A, embodiments of the inventive concept propose that outstanding transactions be redundant. That is, the respective redundant outstanding transactions may have the same transaction ID and the same direction, i.e., the same slave. For instance, the first through sixth transactions T1 to T6 may have the same transaction ID. That is, the transaction ID of the first through sixth transactions T1 to T6 may have a value A. Also, a direction of the first, second, and fourth transactions T1, T2, and T4 may relate to the second slave 32, and a direction of the third, fifth, and sixth transactions T3, T5, and T6 may relate to the first slave 31.

In addition, the redundant outstanding transactions may be respectively allocated to the same slot. That is, a slot previously allocated by a conventional outstanding transaction may have sufficiently free space for allocating a new outstanding transaction.

Referring to FIGS. 3 and 6A, the slot manager 24 may add the first transaction T1 to the list 25. The first transaction T1 may not be redundant with respect to other transactions at the list 25. This is because the first transaction T1 does not have any other transaction to share a slot with. Also, the first slot slot1 may be a new free slot. Accordingly, the first transaction T1 may be allocated to the first slot, i.e., slot1.

Referring to FIGS. 3 and 6B, the slot manager 24 may add the second transaction T2 to the list 25. The second transaction T2 may not be redundant with respect to other transactions at the list 25. That is, the second transaction T2 cannot share with the first slot slot1 to which the first transaction T1 is allocated. This is because the first transaction T1 has a beat count (i.e., the number of beats) of 16, and each of the first through sixteenth slots has a length of 16. Accordingly, the second transaction T2 may be allocated to a new slot, namely, the second slot slot2.

Referring to FIGS. 3 and 6C, the slot manager 24 may add the third transaction T3 to the list 25. The third transaction T3 is not redundant with respect to other transactions at the list 25. That is, the third transaction T3 cannot share the first slot slot1 to which the first transaction T1 is allocated or the second slot slot2 to which the second transaction T2 is allocated. This is because the third transaction T3 has a different direction than the first and second transactions T1 and T2. Accordingly, the third transaction T3 may be allocated to a new slot, namely, the third slot slot3.

Referring to FIGS. 3 and 6D, the slot manager 24 may add the fourth transaction T4 to the list 25. The fourth transaction T4 may be redundant with respect to other transactions at the list 25. This is because the fourth transaction T4 and the second transaction T2 have the same transaction ID as well as the same direction e.g., a common slave, and the second slot slot2 to which the second transaction T2 is allocated has a sufficient free space for allocating the fourth transaction T4. That is, the second transaction T2 may have a beat count of 8, and the fourth transaction T4 may have a beat count of 4. Accordingly, the fourth transaction T4 may be allocated to the second slot slot2.

Referring to FIGS. 3 and 6E, the slot manager 24 may add the fifth transaction T5 to the list 25. The fifth transaction T5 may be redundant with respect to other transactions at the list 25. This is because the fifth transaction T5 and the third transaction T3 have the same transaction ID and the same direction, and the third slot slot3 to which the third transaction T3 is allocated has sufficient free space for allocating the fifth transaction T5. That is, the third transaction T3 may have a beat count of 1, and the fifth transaction T5 may have a beat count of 1. Accordingly, the fifth transaction T5 may be allocated to the third slot slot3.

Referring to FIGS. 3 and 6F, the slot manager 24 may add the sixth transaction T6 to the list 25. The sixth transaction T6 may be redundant with respect to other transactions at the list 25. This is because the sixth transaction T6 and the third and fifth transactions T3 and T5 have the same transaction ID and the same direction, and the third slot slot3 to which the third and fifth transactions T3 and T5 are allocated has a sufficient free space for allocating the sixth transaction T6. That is, the sixth transaction T6 may have a beat count of 1, and each of the third and fifth transactions T3 and T5 may have a beat count of 1. Accordingly, the sixth transaction T6 may be allocated to the third slot slot3.

Figure 7:
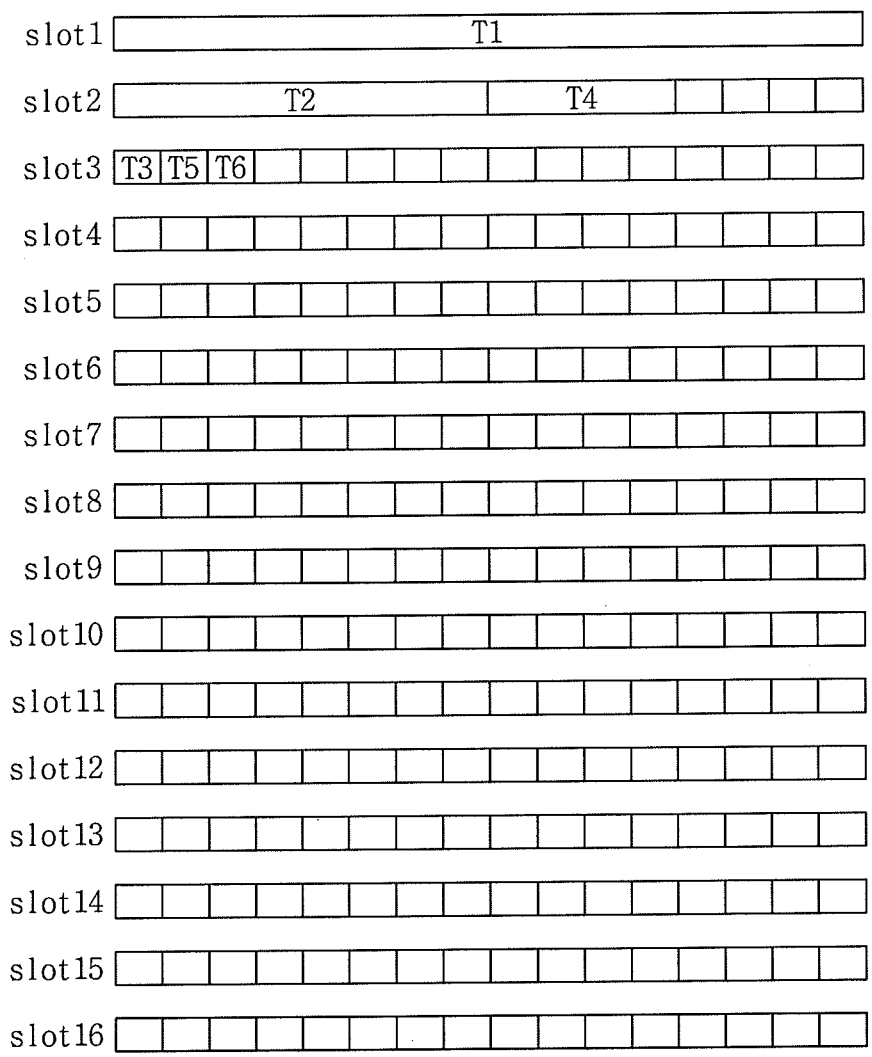
FIG. 7 illustrates a slot array corresponding to the list shown in FIG. 6F.

FIG. 7 illustrates a slot array corresponding to the list 25 shown in FIG. 6F.

Referring to FIGS. 6F and 7, each of the first through sixth transactions T1 to T6 may be stored in an allocated slot. Data corresponding to the first transaction T1 may have a burst length of 16. Also, the first slot slot1 may have a burst length of 16. Accordingly, the first slot slot1 may store only data corresponding to the first transaction T1.

In addition, data corresponding to the second transaction T2 may have a burst length of 8, and data corresponding to the fourth transaction T4 may have a burst length of 4. Also, the second slot slot2 may have a burst length of 16. The second slot slot2 may store data corresponding to the second and fourth transactions T2 and T4.

Furthermore, data corresponding to the third transaction T3 may have a burst length of 1, data corresponding to the fifth transaction T5 may have a burst length of 1, and data corresponding to the sixth transaction T6 may have a burst length of 1. Also, the third slot slot3 may have a burst length of 16. The third slot slot3 may store data corresponding to the third, fifth, and sixth transactions T3, T5, and T6.

Figure 8:
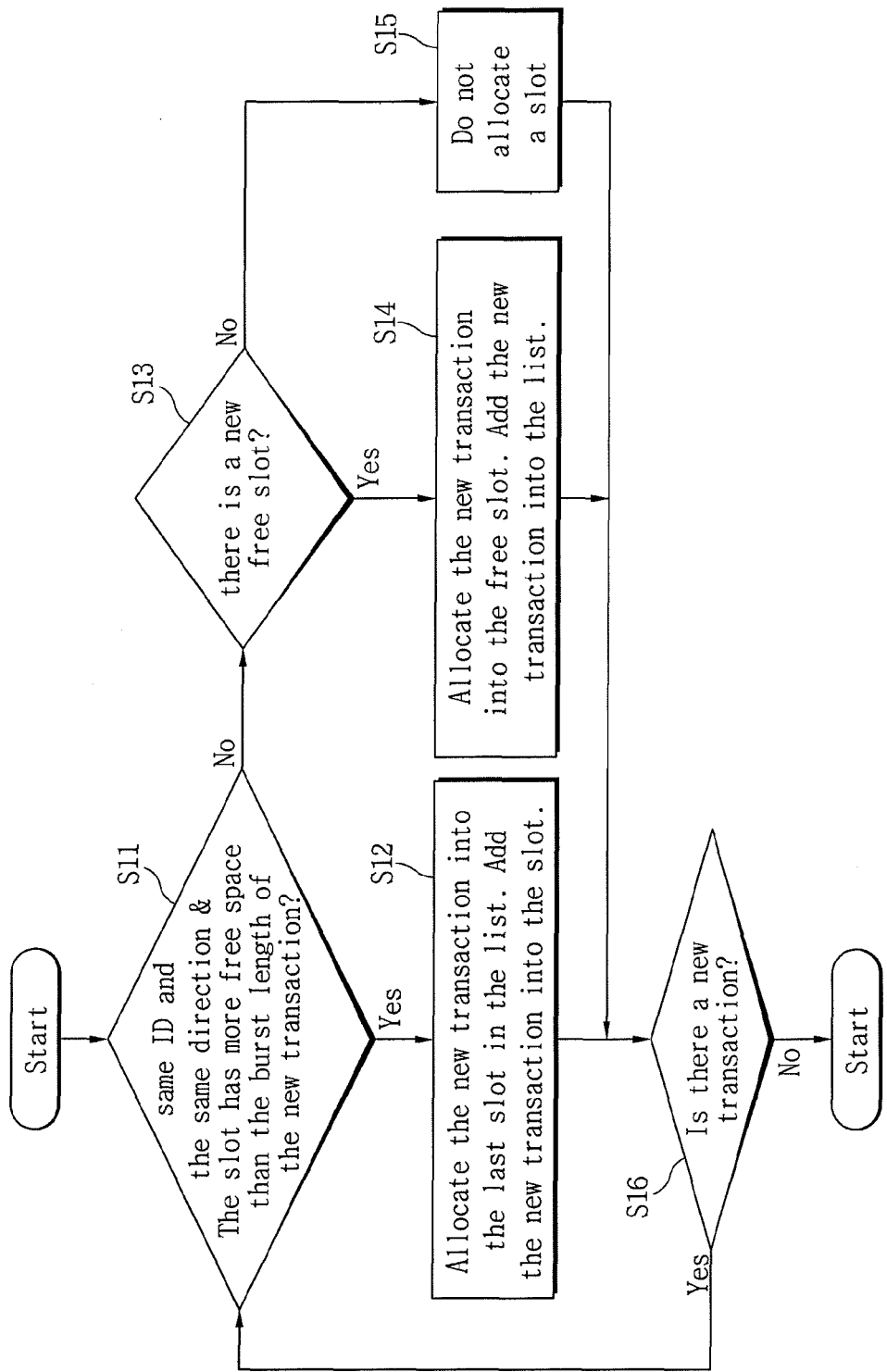
FIG. 8 is a flowchart illustrating operations of a reorder buffer according to an embodiment of the inventive concept.

FIG. 8 is a flowchart illustrating operations of a reorder buffer according to an embodiment of the inventive concept. The illustrated operations relate to a method for driving an SOC 100. In describing a method according to the flowchart, reference is made to elements of FIGS. 2-7.

Referring to FIGS. 3 and 6A through 8, at operation S11, the slot manager 24 may determine whether or not a new transaction is redundant with reference to the list 25. That is, the slot manager 24 may determine whether or not there are transactions stored in the slot array 23, which have the same transaction ID and the same direction as the new transaction. Also, the slot manager 24 may determine whether or not a final slot of the list 25 has a free space greater than the burst length of the new transaction.

Since the list 25 is empty, the first transaction T1 may not be redundant. Similarly, the second and third transactions T2 and T3 may not be redundant.

However, the fourth transaction T4 has the same transaction ID and the same direction as the second transaction T2. Also, the second slot slot2 to which the second transaction T2 is allocated may have a slot length greater than the sum of the burst lengths of the second and fourth transactions T2 and T4. Accordingly, the fourth transaction T4 may be redundant.

Furthermore, the fifth transaction T5 may have the same transaction ID and the same direction as the third transaction T3. Also, the third slot slot3 to which the third transaction T3 is allocated may have a slot length greater than the sum of the burst lengths of the third and fifth transactions T3 and T5. Accordingly, the fifth transaction T5 may be redundant.

Similarly, the sixth transaction T6 may have the same transaction ID and the same direction as the third and fifth transactions T3 and T5. The third slot slot3 to which the third and fifth transactions T3 and T5 are allocated may have a slot length that is greater than the sum of the burst lengths of the third, fifth, and sixth transactions T3, T5, and T6. Accordingly, the sixth transaction T6 may be redundant. When a new transaction is determined to be redundant, operation S12 may be executed. Otherwise, operation S13 may be executed.

At operation S12, the slot manager 24 may add a new transaction to the list 25. Also, the slot manager 24 may allocate the new transaction to a slot.

For example, since the fourth transaction T4 is redundant, the slot manager 24 may add the fourth transaction T4 to the list 25, and allocate the fourth transaction T4 to the second slot slot2 to which the second transaction T2 is allocated. Also, since the fifth transaction T5 is redundant, the slot manager 24 may add the fifth transaction T5 to the list 25, and allocate the fifth transaction T5 to the third slot slot3 to which the third transaction T3 is allocated. Similarly, since the sixth transaction T6 is redundant, the slot manager 24 may add the sixth transaction T6 to the list 25, and allocate the sixth transaction T6 to the third slot slot3 to which the third transaction T3 is allocated.

At operation S13, the slot manager 24 may determine whether there is a new available slot. When a determination is made that there is the new free slot, operation S14 may be executed. Otherwise, operation S15 may be executed.

At operation S14, the slot manager 24 may allocate a new transaction to an available slot. Also, the slot manager 24 may add the new transaction to the list 25. For example, the slot manager 24 may add the first transaction T1 to the list 25, and allocate the first transaction T1 to the first slot slot1. Also, the slot manager 24 may add the second transaction T2 to the list 25, and allocate the second transaction T2 to the second slot slot2.

At operation S15, the slot manager 24 may not add the new transaction to the list 25. In this case, the SOC 100 may be in a deadlock state, i.e., a standstill state. Accordingly, the first master 11 should be in a standby state until a free slot occurs in the slot array 23.

At operation S16, the slot manager 24 may determine whether there is a new transaction. When there is the new transaction, operation S11 may be repeated. Otherwise, the method of driving the SOC 100 may end.

Figure 9:
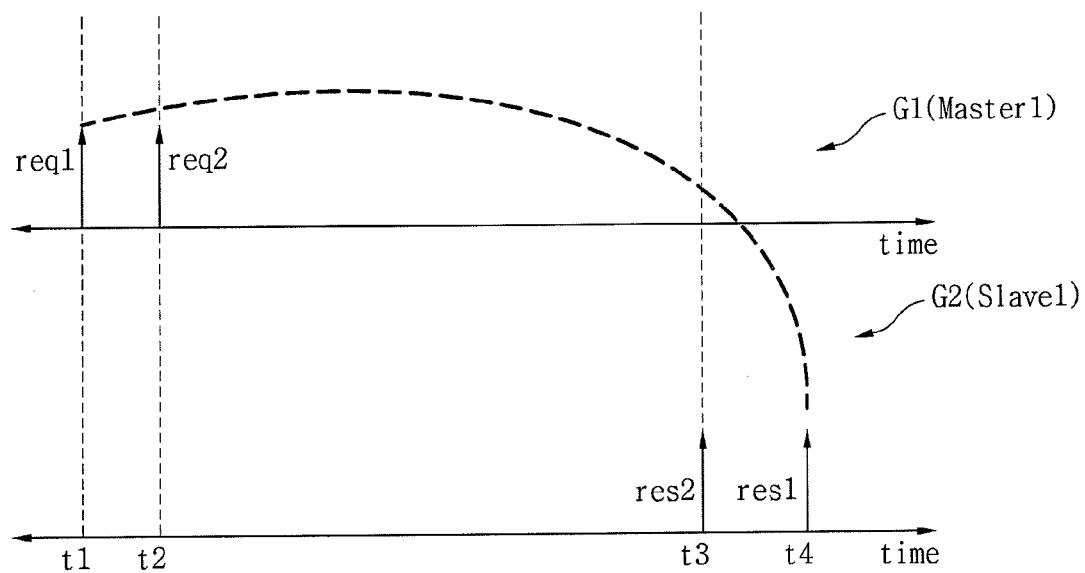
FIG. 9 is a conceptual diagram illustrating operations of a reorder buffer according to an embodiment of the inventive concept.

FIG. 9 is a conceptual diagram illustrating operations of a reorder buffer according to another embodiment of the inventive concept.

Referring to FIG. 9, first curve G1 illustrates a request of the first master 11 over time, and second curve G2 illustrates a response of the first slave 31 over time.

At a time point t1, the first master 11 may request a first request req1 from the first slave 31 through the system interconnection 20. At a time point t2, the first master 11 may request a second request req2 from the first slave 31 through the system interconnection 20.

At a time point t3, the first slave 31 may transmit a second response res2 to the second request req2 through the system interconnection 20 to the first master 11. At a time point t4, the first slave 31 may transmit a first response res1 to the first request req1 through the system interconnection 20 to the first master 11.

When the first response res1 to the first request req1 arrives later than the second response res2, for example, according to a round-robin arbitration, the firstly arriving response, i.e., the second response res2, may be transmitted to the first master 11 before the first response res1.

In contrast, in the reorder buffer according to the second embodiment of the inventive concept, a response to a first request may be firstly transmitted to a master. That is, even if the second response res2 arrives earlier than the first response res1, the first response res1 may be firstly transmitted to the first master 11.

Operations of the reorder buffer according to a foregoing embodiment of the inventive concept are described in detail with reference to FIGS. 10A through 13B.

Figures 10A, 10B:
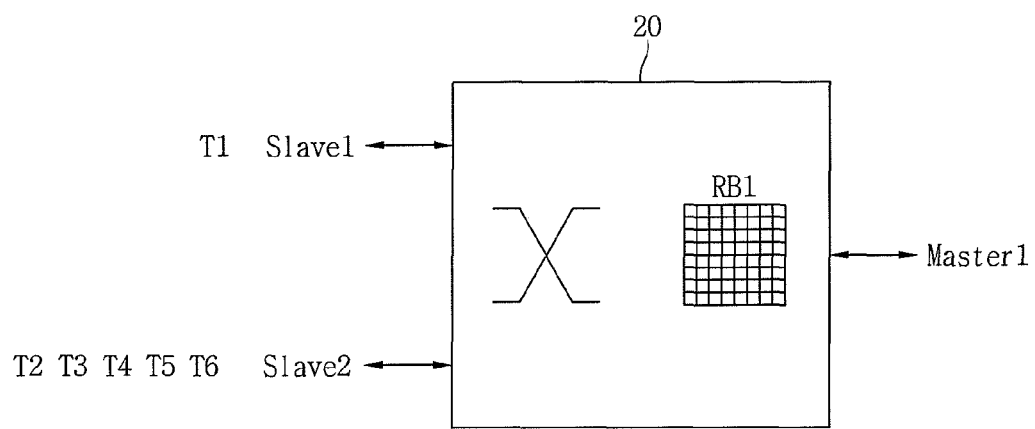
FIG. 10A is a conceptual diagram illustrating operations of the reorder buffer according to an embodiment of the inventive concept.
FIG. 10B illustrates a table showing first through sixth transactions shown in FIG. 10A.

FIG. 10A is a conceptual diagram illustrating operations of the reorder buffer according to an embodiment of the inventive concept.

Referring to FIG. 10A, the first master 11 may access the first or second slave 31 or 32 based on a first reorder buffer RB1. For example, the first master 11 may generate a first transaction T1 configured to access the first slave 31 based on the first reorder buffer RB1. Also, the first master 11 may generate second through sixth transactions T2 to T6 configured to access the second slave 32 based on the first reorder buffer RB1.

FIG. 10B illustrates a table showing the first through sixth transactions T1 to T6 shown in FIG. 10A.

Referring to FIG. 10B, a transaction ID of the first transaction T1 has a value A, and a transaction ID of each of the second through sixth transactions T2 to T6 has a value B. Each of the first and second transactions T1 and T2 may have a burst length of 1. Each of the third through sixth transactions T3 to T6 may have a burst length of 16.

FIGS. 11A through 11I are conceptual diagrams illustrating operations according to round-robin arbitration.

Referring to FIGS. 9 through 11A, the slot array 23 may include first through sixteenth slots slot1 to slot16. The first slot slot1 may store data, i.e., the first response res1, corresponding to the first transaction T1. The second slot slot2 may store data, i.e., the second response res2, corresponding to the second transaction T2. The third slot slot3 may store data corresponding to the third transaction T3. The fourth slot slot4 may store data corresponding to the fourth transaction T4. The fifth slot slot5 may store data corresponding to the fifth transaction T5. The sixth slot slot6 may store data corresponding to the sixth transaction T6.

The data stored in the first through sixth slots slot1 to slot6 may be output according to a round-robin arbitration. That is, when the first response res1 to the first request req1 arrives later than the second response res2, a round-robin arbitration pointer (RAP) may point at the second slot slot2. Accordingly, the data stored in the second slot slot2 may be transmitted to the first master 11. Thereafter, the second slot slot2 may be initialized.

Figure 11A:
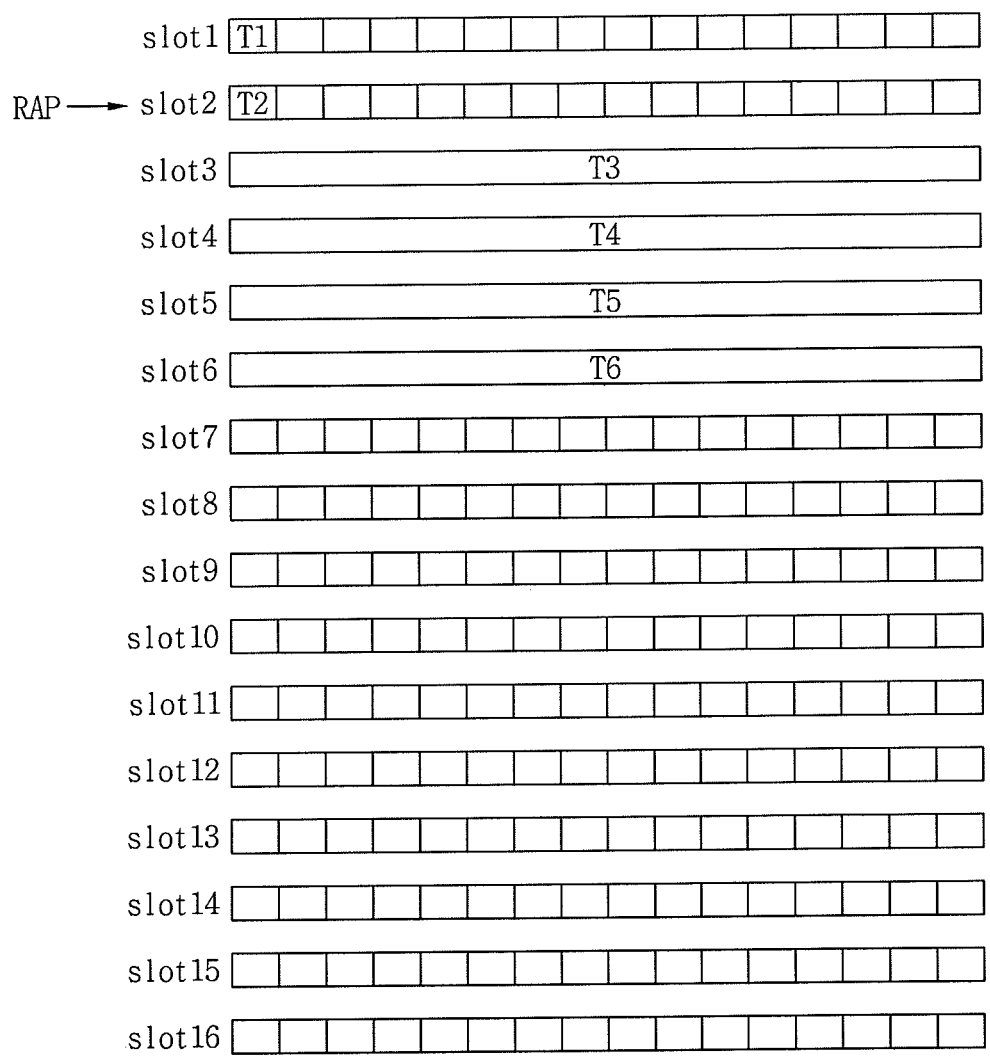
FIGS. 11A through 11H are conceptual diagrams illustrating operations according to a round-robin arbitration.
Figure 11B:
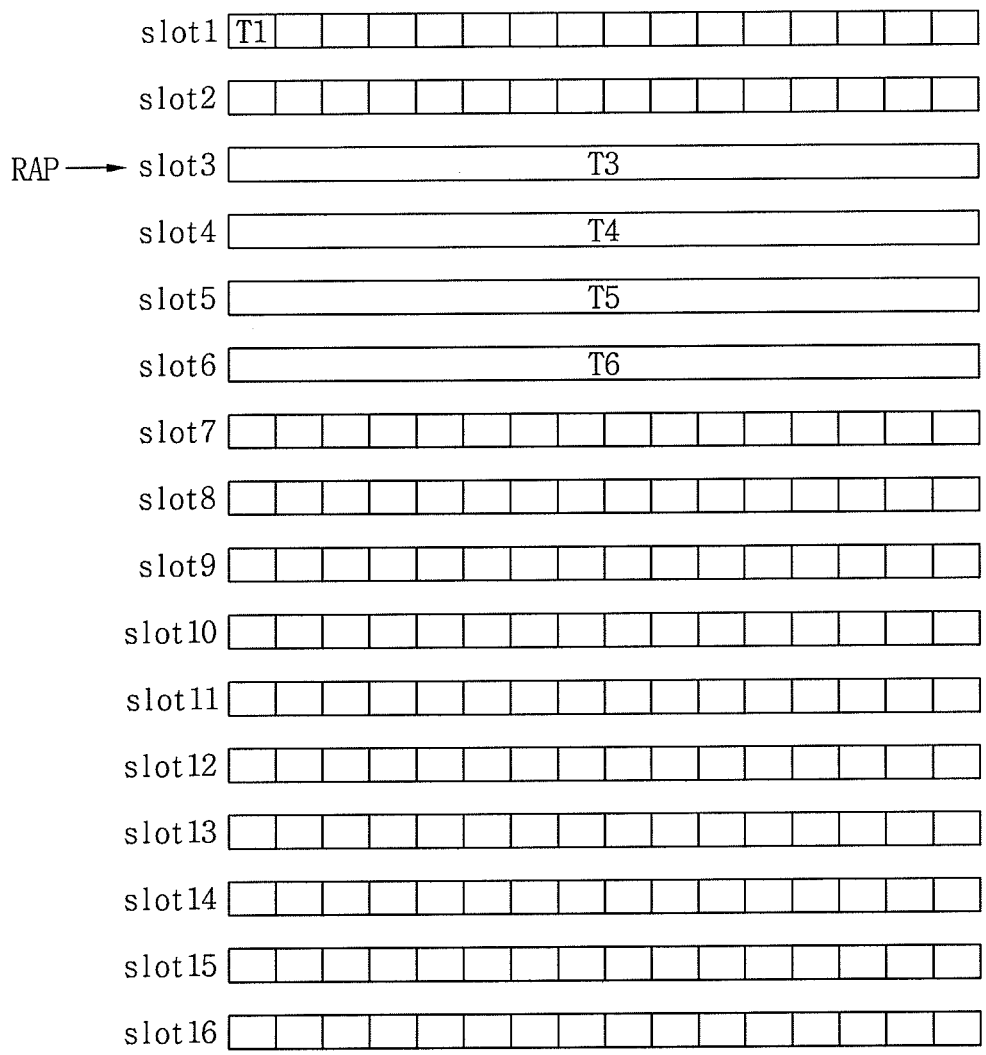

Referring to FIG. 11B, the RAP may move to the third slot slot3. Accordingly, the data stored in the third slot slot3 may be transmitted to the first master 11. Thereafter, the third slot slot3 may be initialized.

Figure 11C:
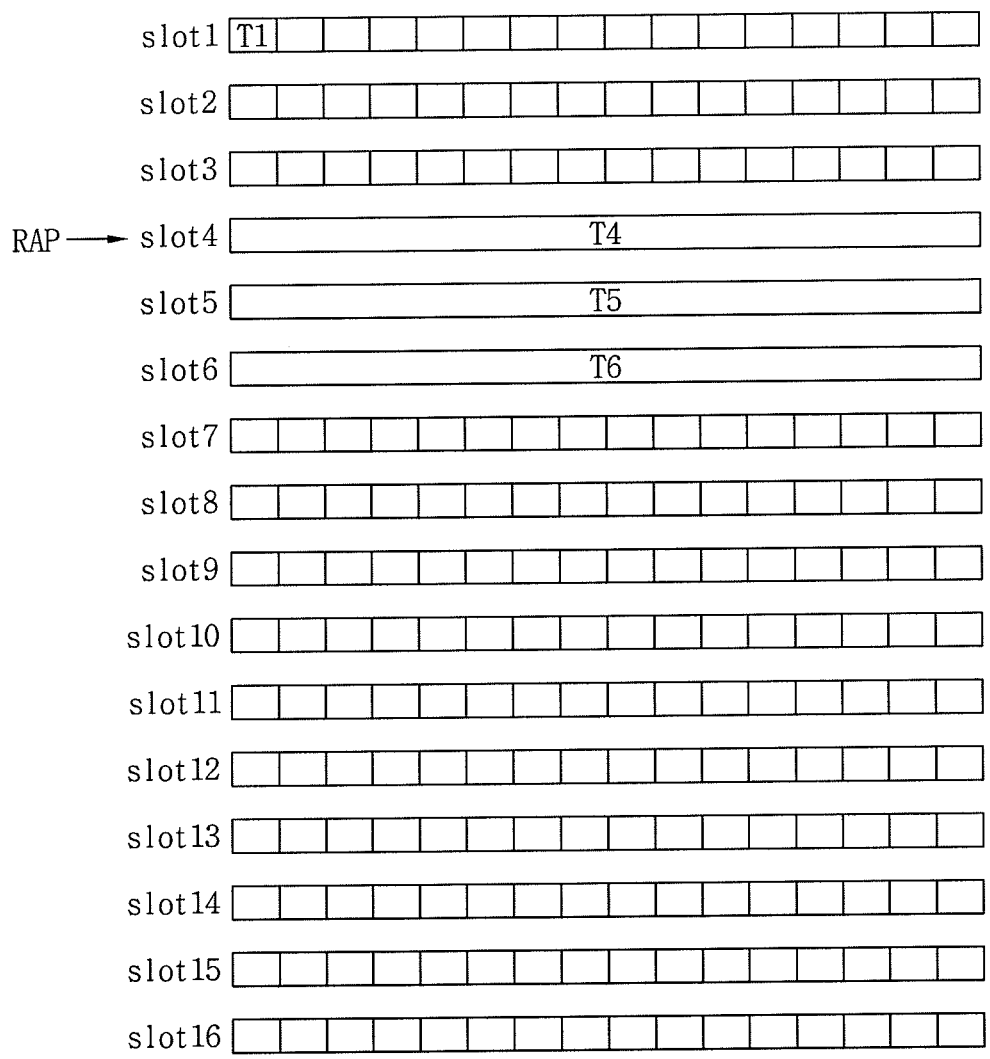

Referring to FIG. 11C, the RAP may move to the fourth slot slot4. Accordingly, the data stored in the fourth slot slot4 may be transmitted to the first master 11. Thereafter, the fourth slot slot4 may be initialized.

Figure 11D:
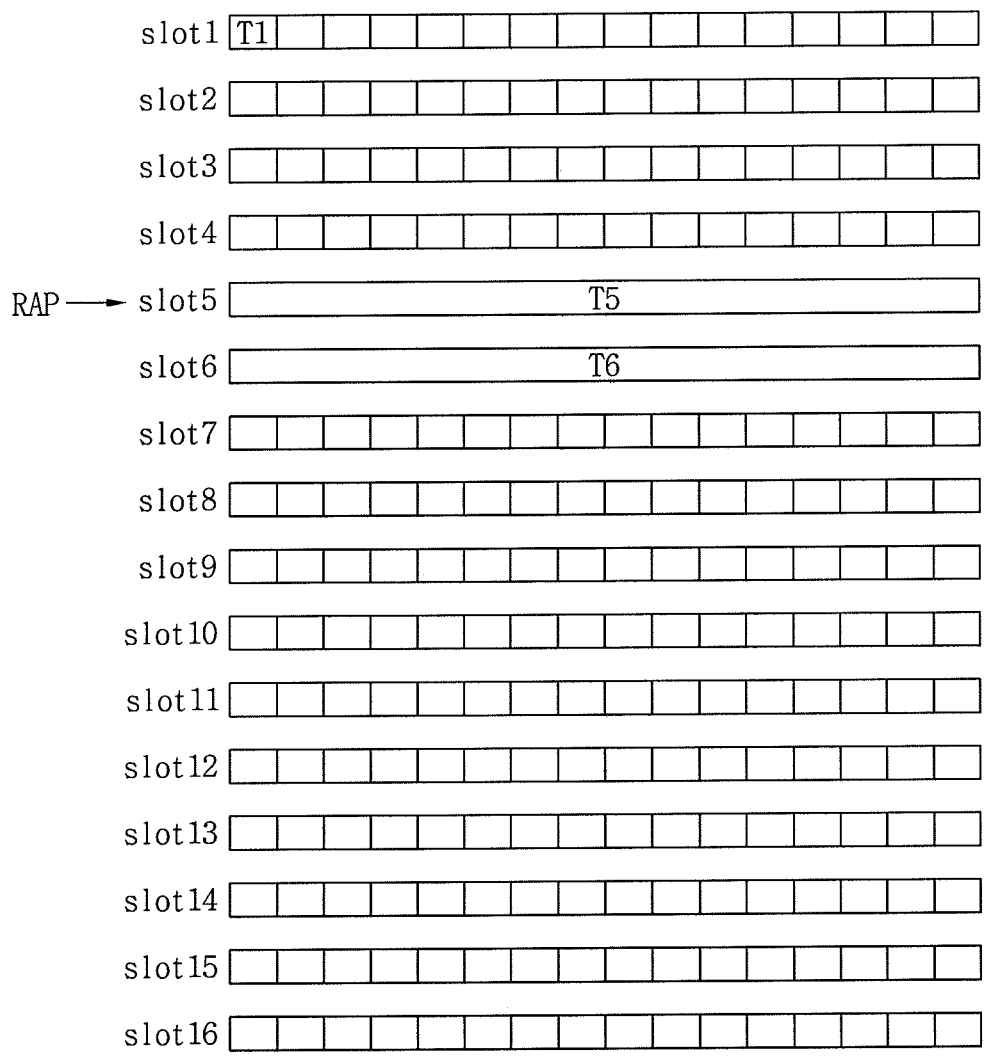

Referring to FIG. 11D, the RAP may move to the fifth slot slot5. Accordingly, the data stored in the fifth slot slot5 may be transmitted to the first master 11. Thereafter, the fifth slot slot5 may be initialized.

Figure 11E:
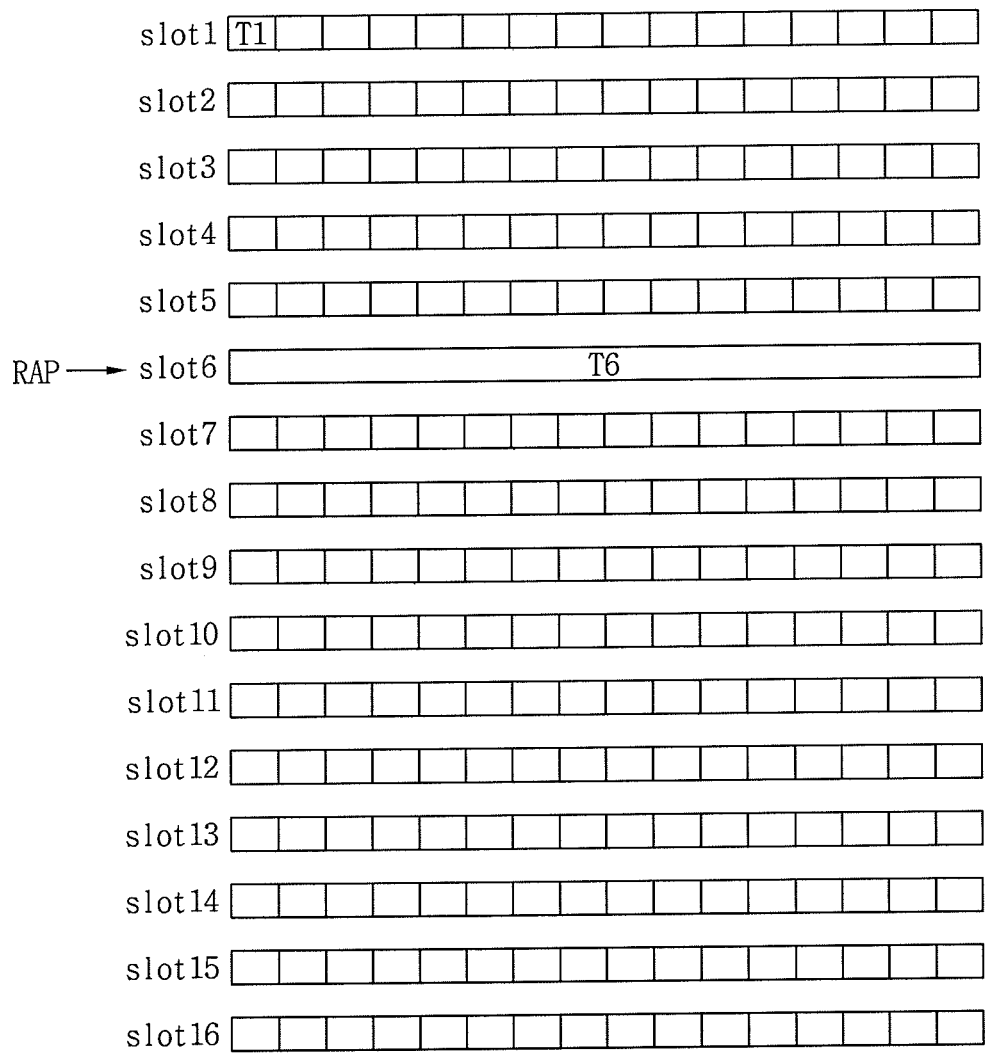

Referring to FIG. 11E, the RAP may move to the sixth slot slot6. Accordingly, the data stored in the sixth slot slot6 may be transmitted to the first master 11. Thereafter, the sixth slot slot6 may be initialized.

Figure 11F:
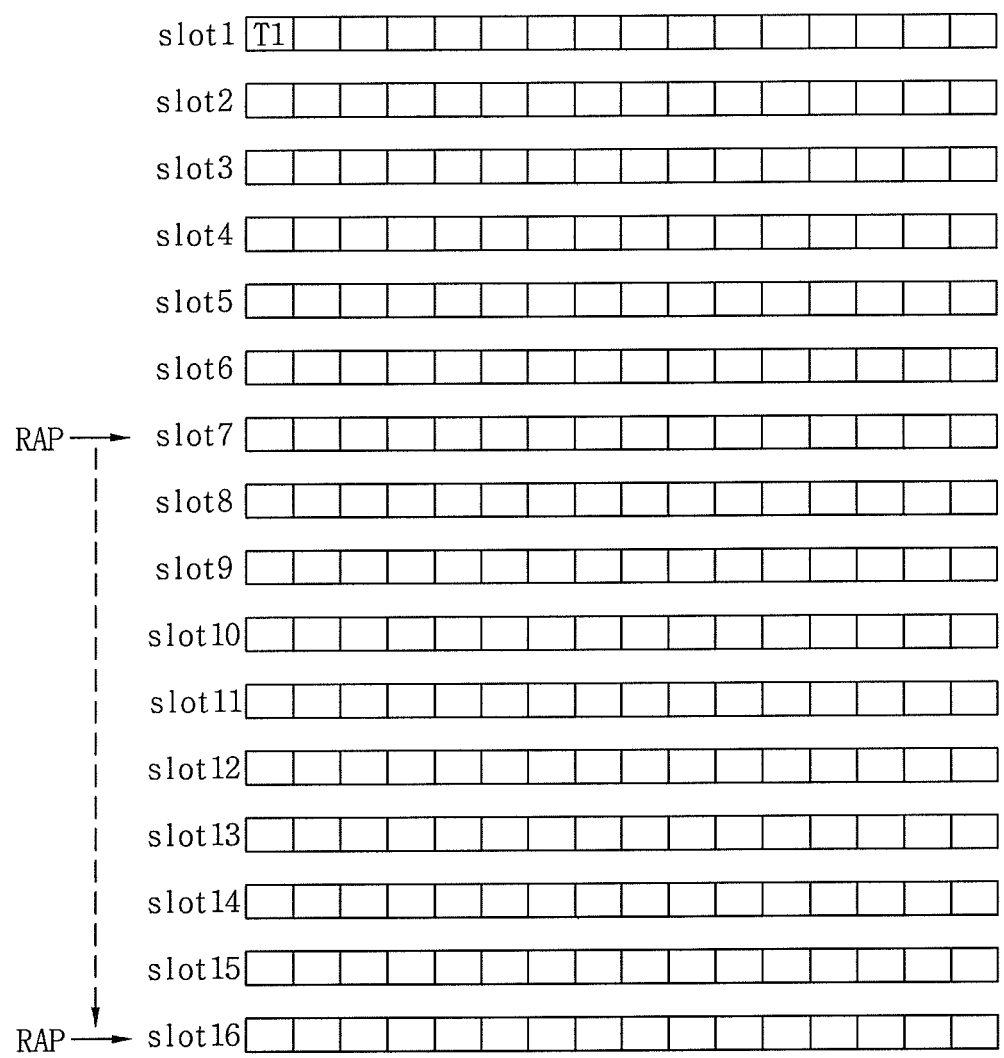

Referring to FIG. 11F, the RAP may sequentially move from the seventh slot slot7 to a different slot, for example, the sixteenth slot16.

Figure 11G:
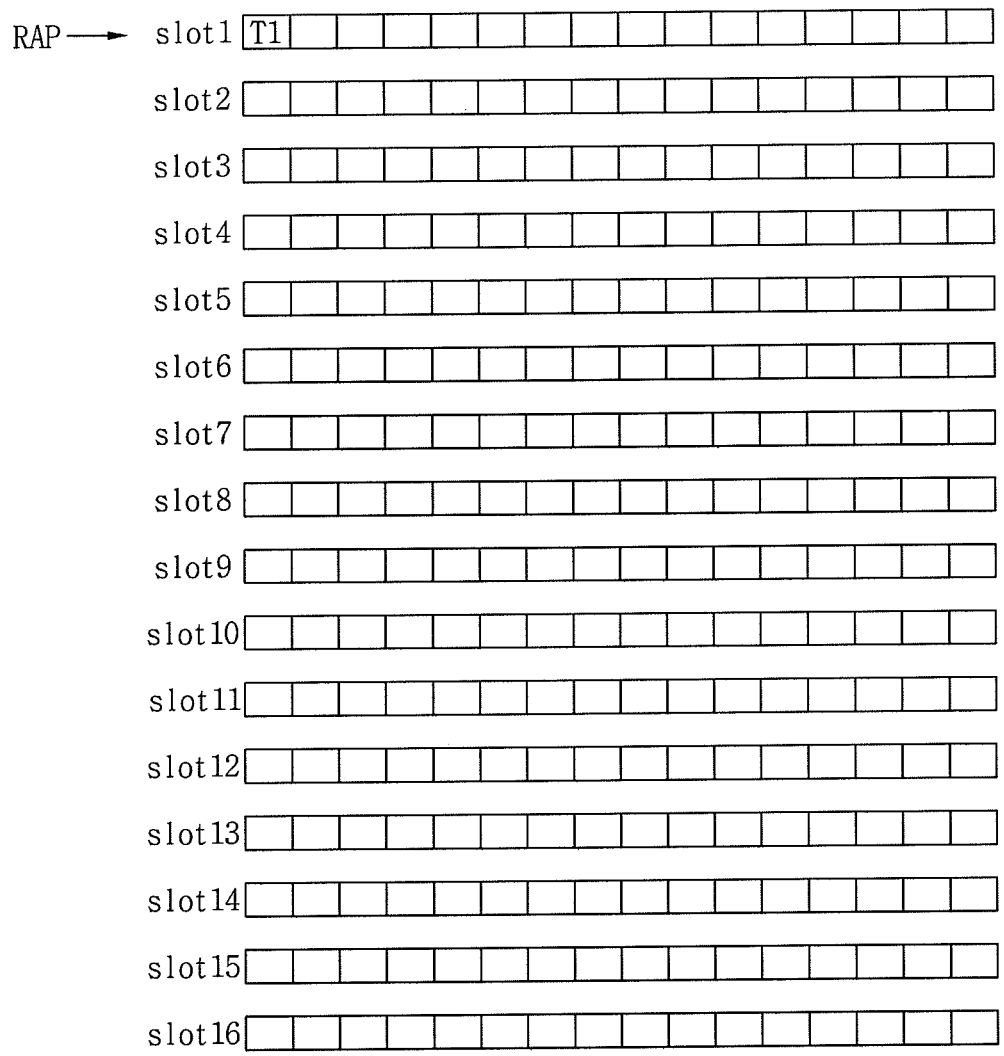

Referring to FIG. 11G, the RAP may move to the first slot slot1. Accordingly, the data stored in the first slot slot1 may be transmitted to the first master 11. Thereafter, the first slot slot1 may be initialized.

Figure 11H:
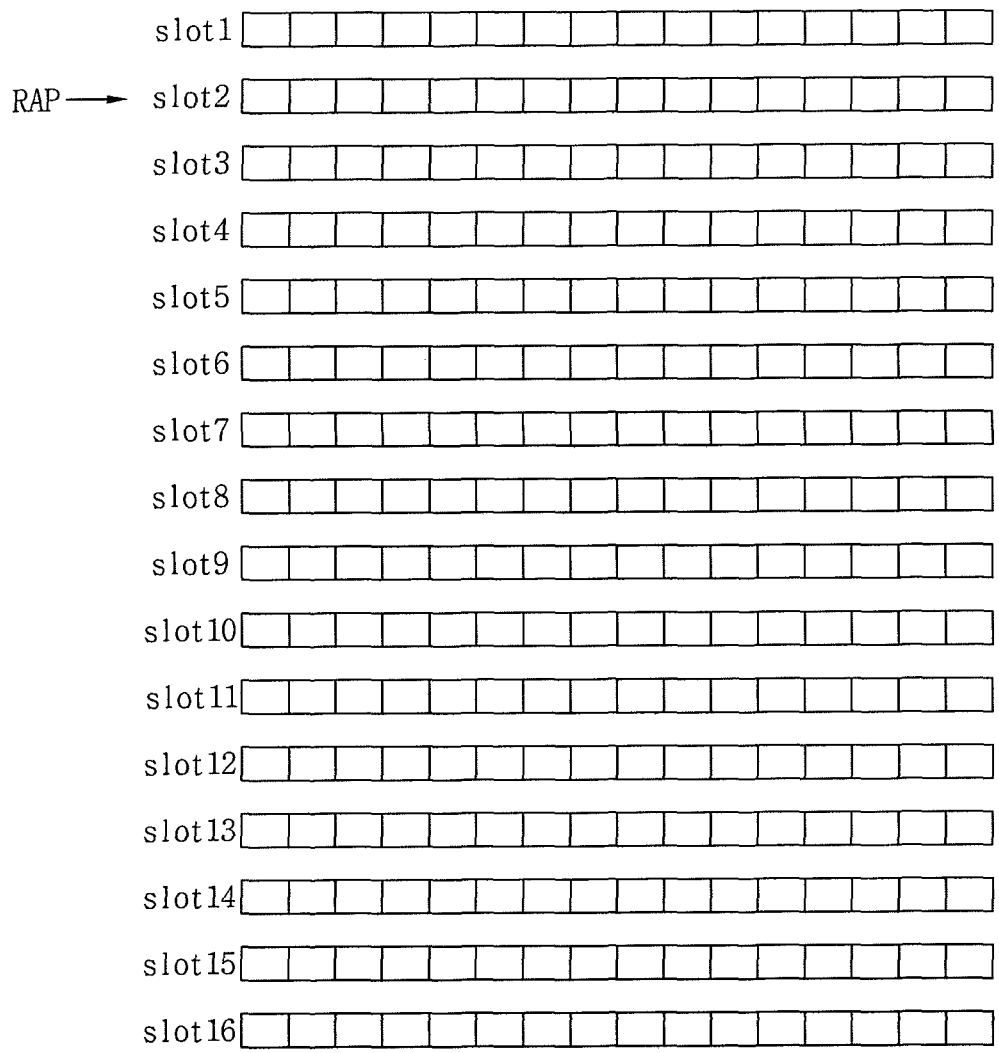

Referring to FIG. 11H, the RAP may move to a different slot, for example, the second slot slot2. Alternatively, the RAP may remain pointing at the first slot slot1, which is the finally initialized slot.

FIGS. 12A through 12G are conceptual diagrams illustrating operations according to aging-based arbitration according to embodiments of the inventive concept.

Referring to FIGS. 9, 10A, 10B, and 12A, the slot array 23 according to an abovementioned embodiment of the inventive concept may include a global queue GQ configured to store the order of transactions. Also, an aging arbitration pointer (AAP) of the global queue GQ may point at the oldest transaction. For example, when the first transaction T1 is the oldest transaction, the AAP may point at the first transaction T1, for example, at slot slot1. The slot array 23 may include first through sixteenth slots slot1 to slot16.

The first slot slot1 may store data (i.e., the first response res1) corresponding to the first transaction T1. The second slot slot2 may store data (i.e., the second response res2) corresponding to the second transaction T2. The third slot slot3 may store data corresponding to the third transaction T3. The fourth slot slot4 may store data corresponding to the fourth transaction T4. The fifth slot slot5 may store data corresponding to the fifth transaction T5. The sixth slot slot6 may store data corresponding to the sixth transaction T6.

The data stored in the first through sixth slots slot1 to slot6 may be output according to aging-based arbitration. That is, even if the first response res1 to the first request req1 arrives later than the second response res2, the AAP may point at the first slot slot1. Accordingly, the data stored in the first slot slot1 may be firstly transmitted to the first master 11. Thereafter, the first slot slot1 may be initialized.

Figure 12A:
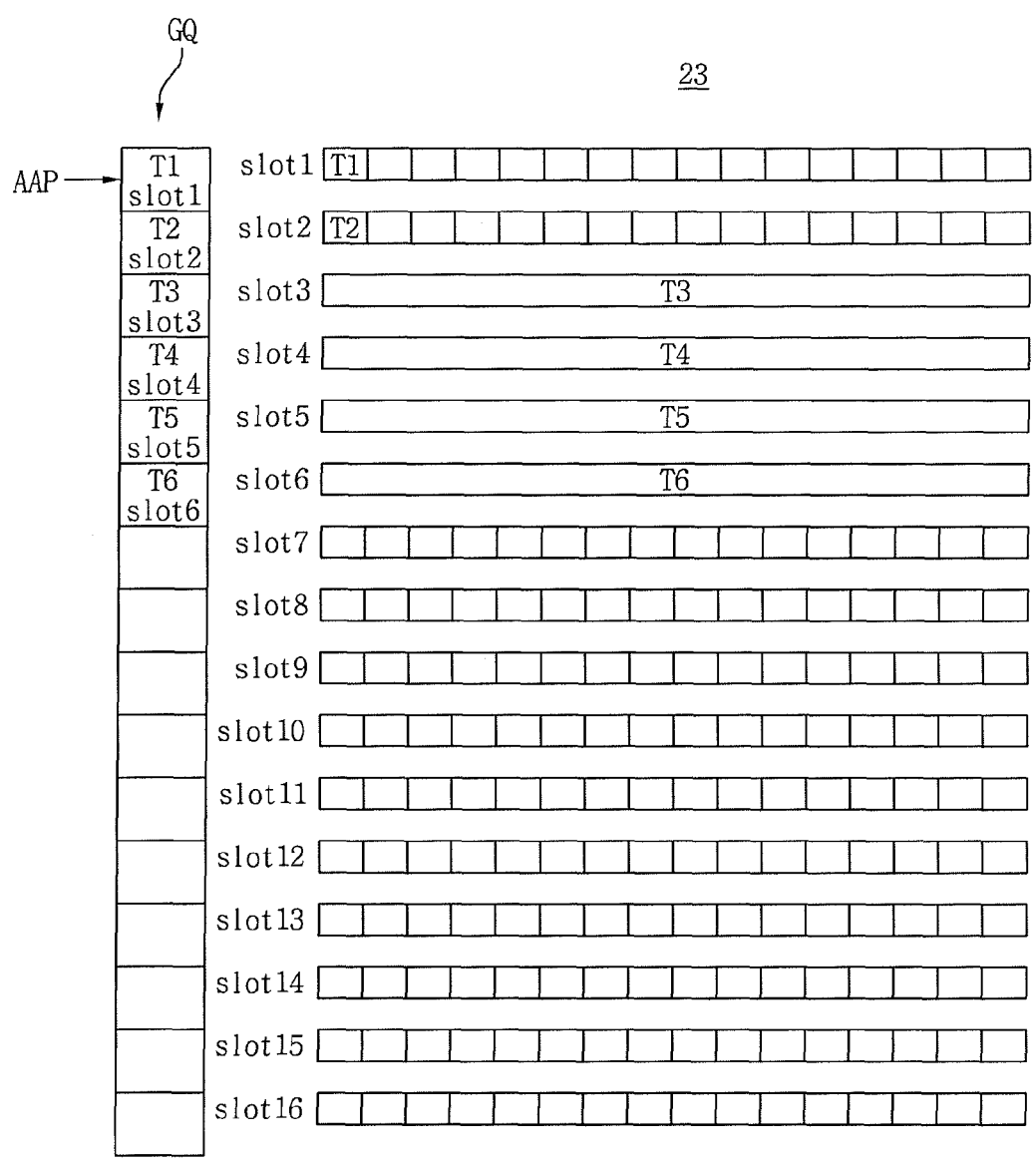
FIGS. 12A through 12G are conceptual diagrams illustrating operations according to aging-based arbitration according to embodiments of the inventive concept.
Figure 12B:
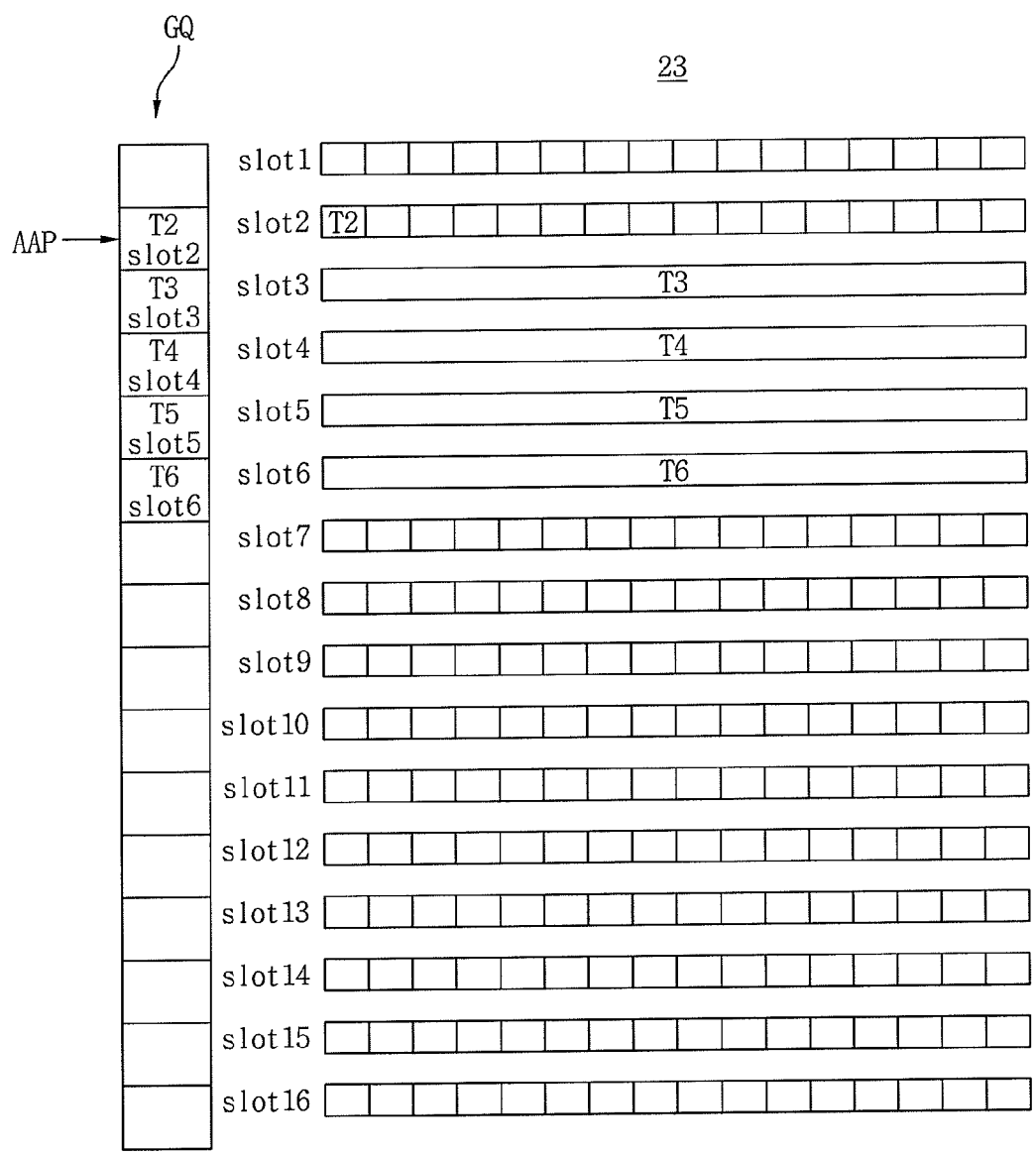

Referring to FIG. 12B, the AAP may move to the second slot slot2. Accordingly, the data stored in the second slot slot2 may be transmitted to the first master 11. Thereafter, the second slot slot2 may be initialized.

Figure 12C:
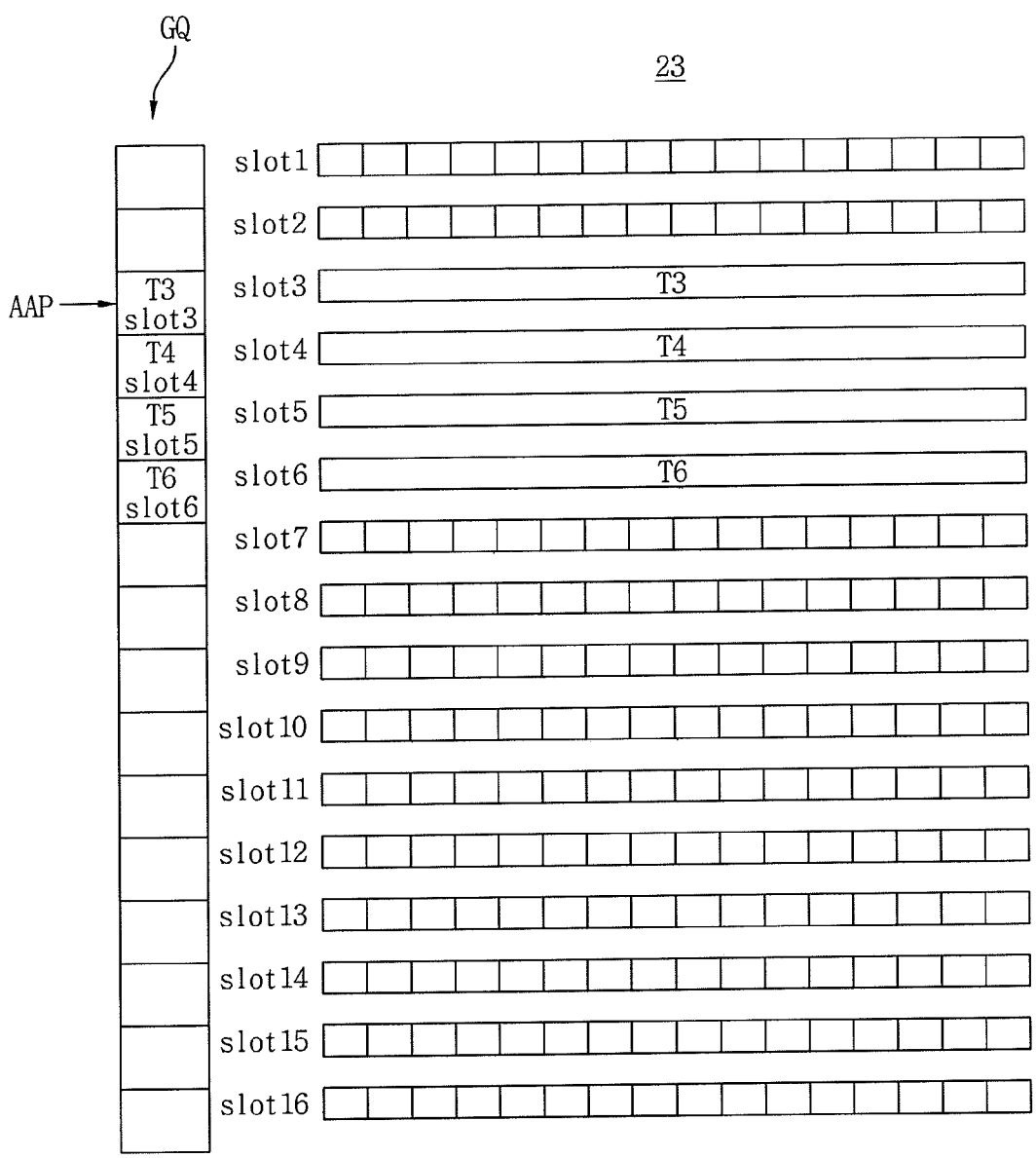

Referring to FIG. 12C, the AAP may move to the third slot slot3. Accordingly, the data stored in the third slot slot3 may be transmitted to the first master 11. Thereafter, the third slot slot3 may be initialized.

Figure 12D:
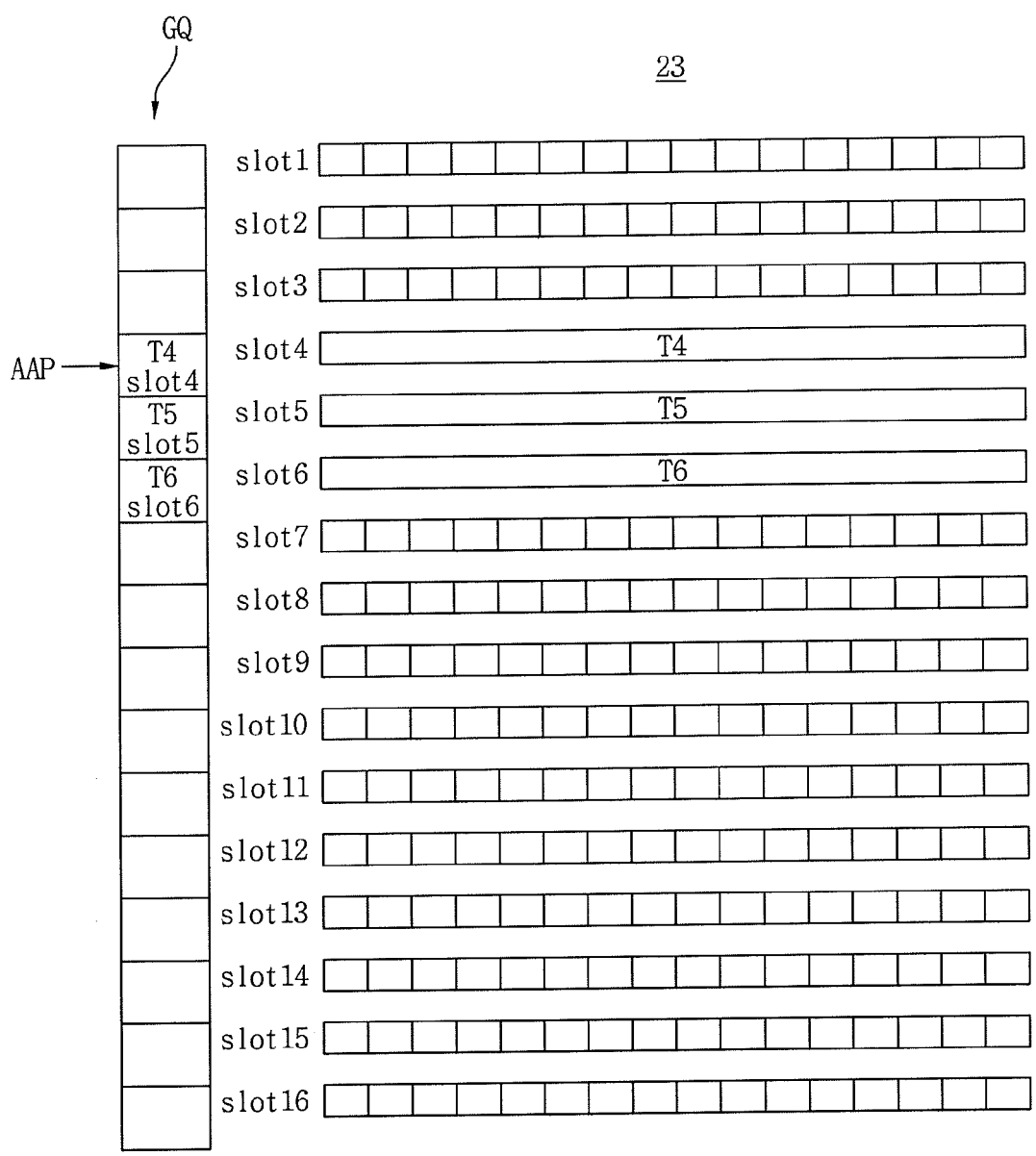

Referring to FIG. 12D, the AAP may move to the fourth slot slot4. Accordingly, the data stored in the fourth slot slot4 may be transmitted to the first master 11. Thereafter, the fourth slot slot4 may be initialized.

Figure 12E:
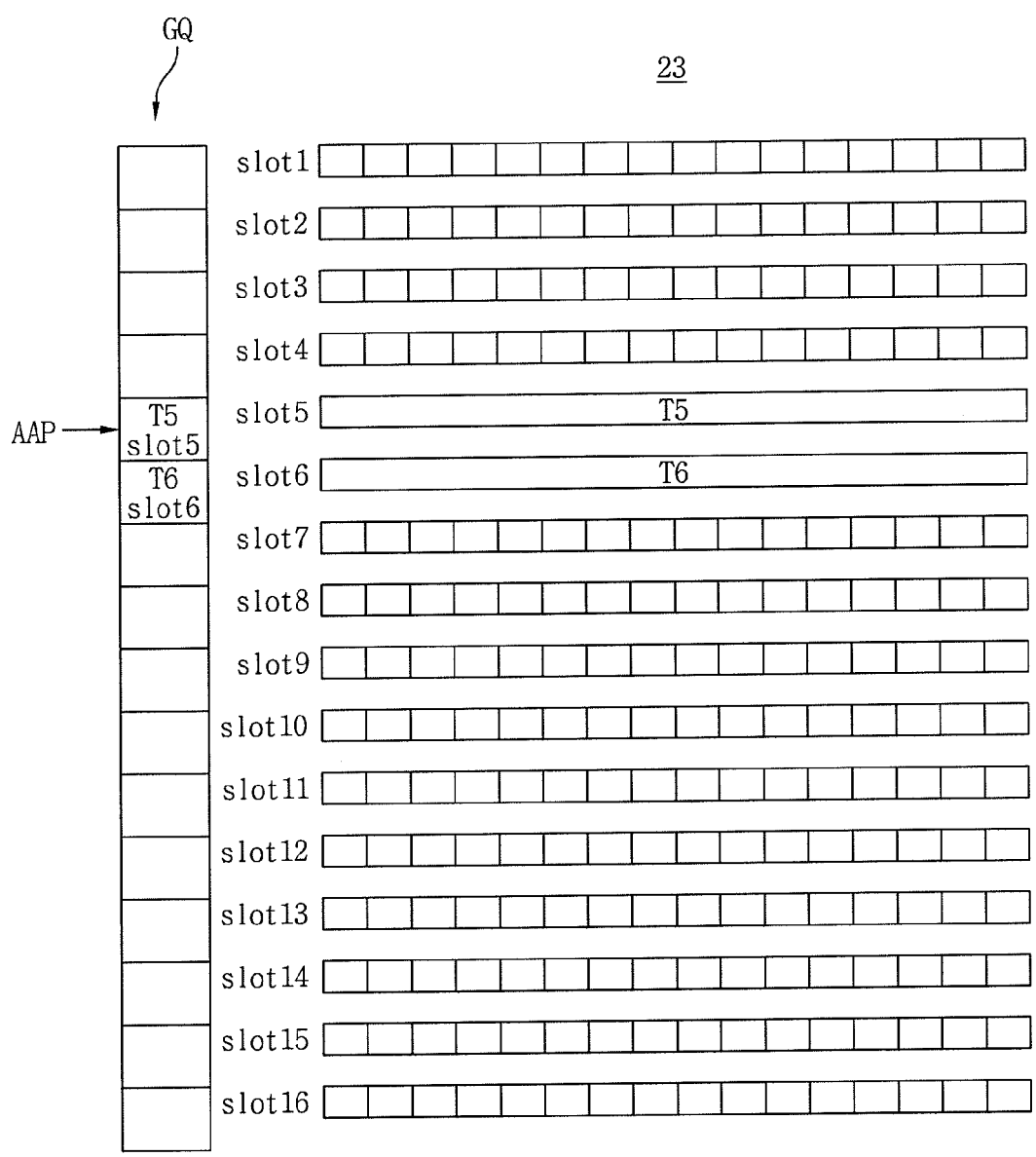

Referring to FIG. 12E, the AAP may move to the fifth slot slot5. Accordingly, the data stored in the fifth slot slot5 may be transmitted to the first master 11. Thereafter, the fifth slot slot5 may be initialized.

Figure 12F:
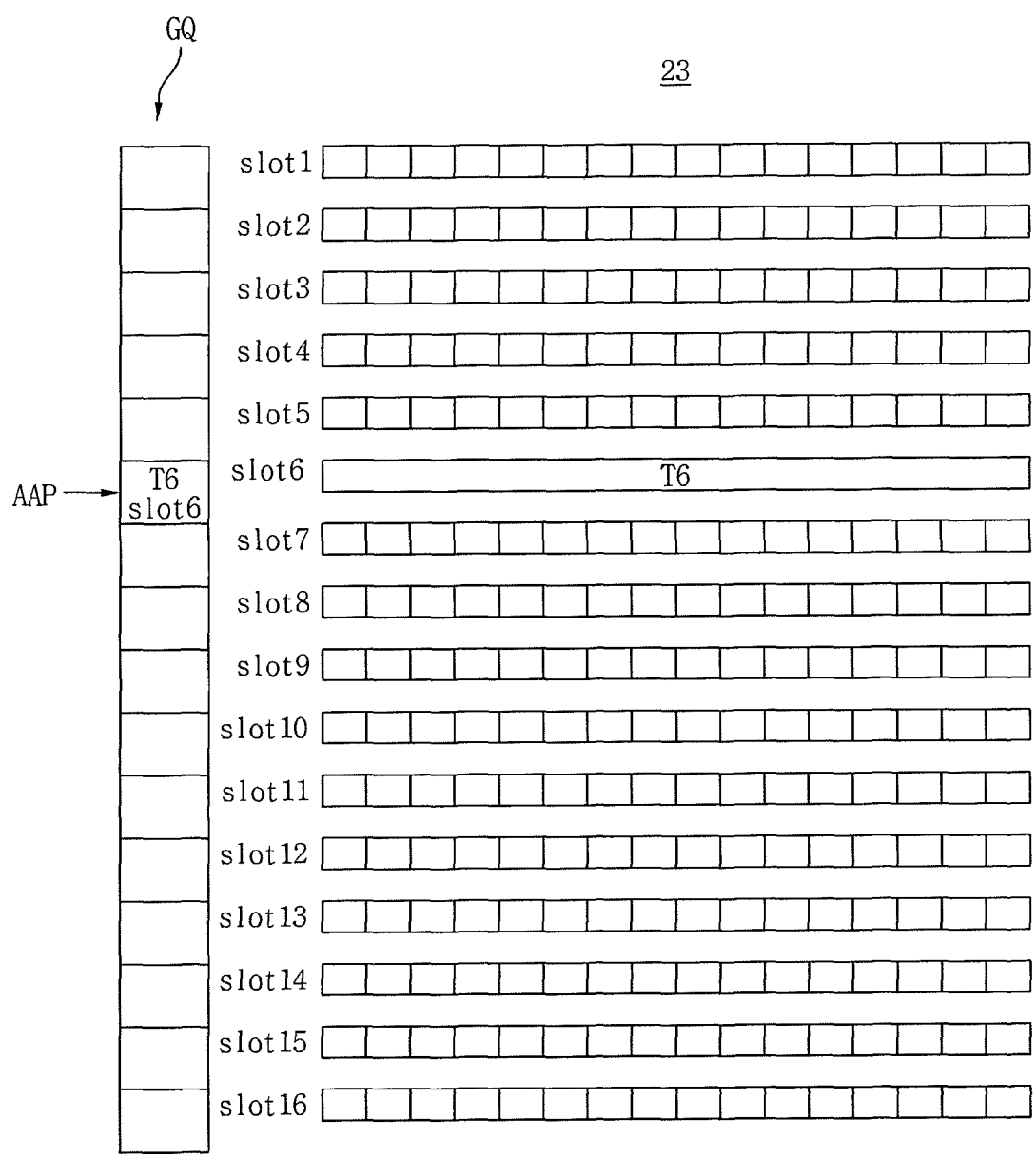

Referring to FIG. 12F, the AAP may move to the sixth slot slot6. Accordingly, the data stored in the sixth slot slot6 may be transmitted to the first master 11. Thereafter, the sixth slot slot6 may be initialized.

Figure 12G:
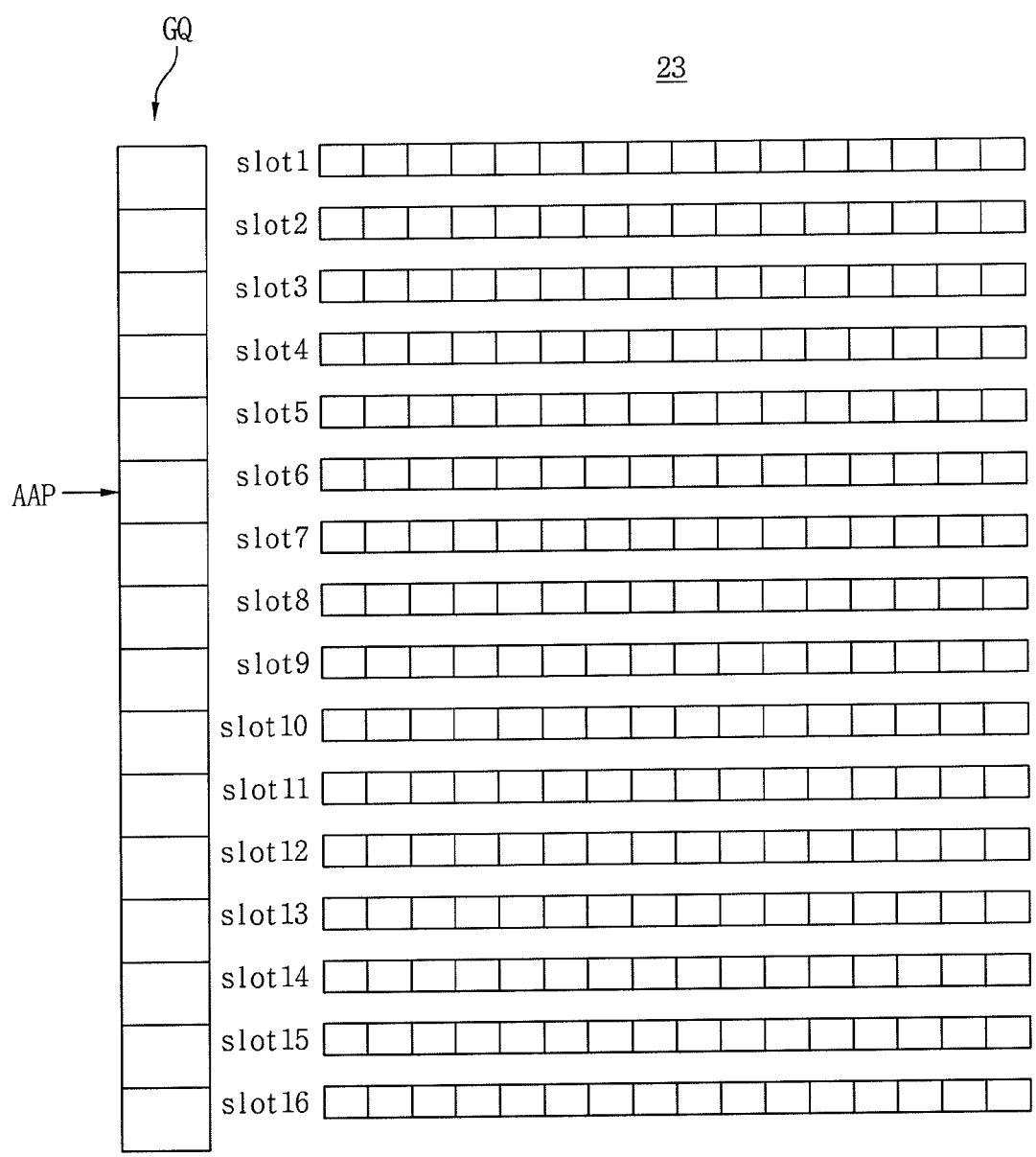

Referring to FIG. 12G the AAP may remain pointing the sixth slot slot6, which is the finally initialized slot. Alternatively, the AAP may move to the first slot slot1.

Figure 13A:
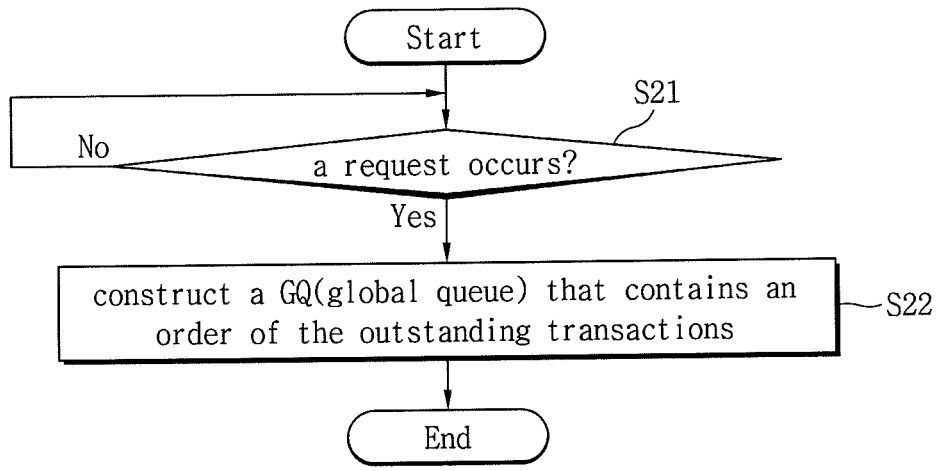
FIGS. 13A and 13B are flowcharts illustrating operations of a first reorder buffer according to an embodiment of the inventive concept.
Figure 13B:
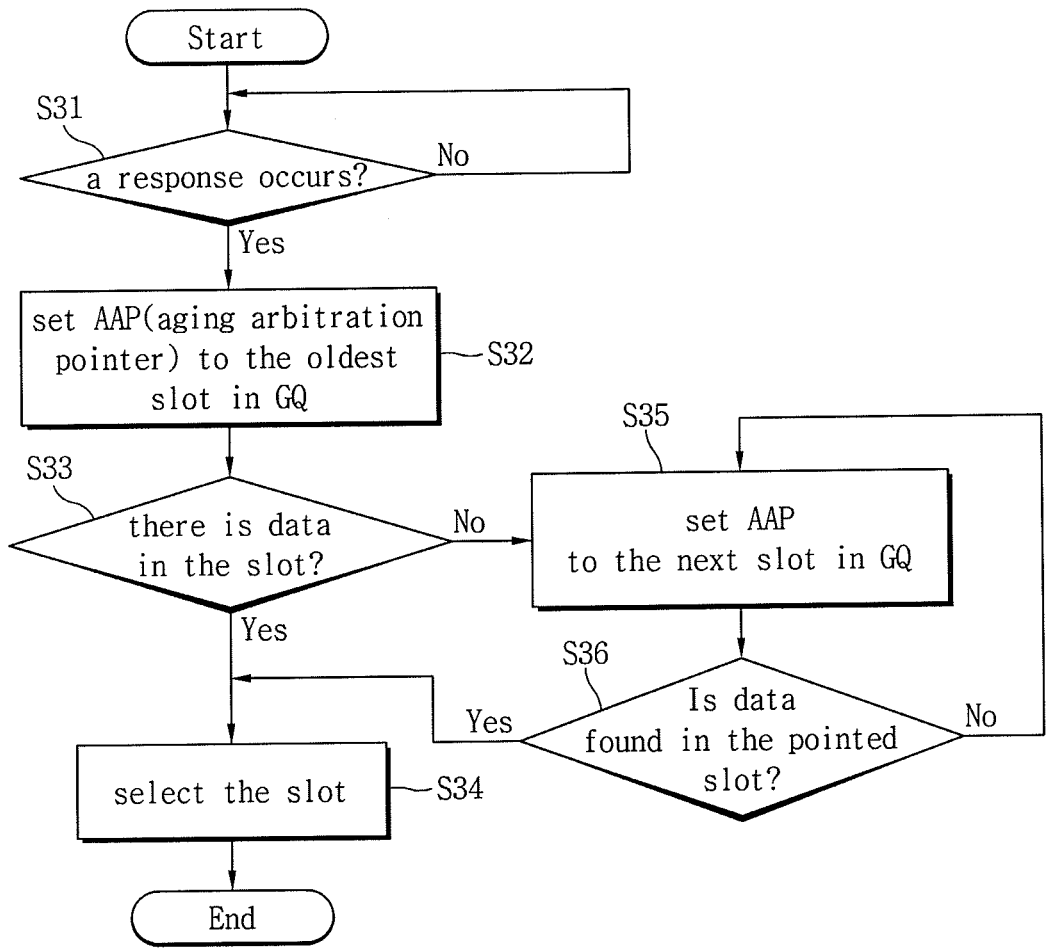

FIGS. 13A and 13B are flowcharts illustrating operations of the first reorder buffer RB1 according to an embodiment of the inventive concept. In particular, FIG. 13A illustrates operations of the first reorder buffer RB1 during a request time, and FIG. 13B illustrates operations of the first reorder buffer RB1 during a response time.

Referring to FIGS. 3 and 13A, for example, during the request time, the first master 11 may transmit a request to the first slave 31 or the second slave 32.

In operation S21, the slot manager 24 may determine whether or not a request occurs. When the request occurs, operation S22 may be executed. Otherwise, operation S21 may be maintained.

In operation S22, the slot array 23 may include a global queue GQ configured to store the order of outstanding transactions. The slot manager 24 may update the global queue GQ. Also, the AAP may point at the oldest one of the transactions in the global queue GQ. For instance, a first transaction T1 corresponding to a first request req1 firstly requested by the first master 11 may become the oldest transaction.

Referring to FIG. 13B, the first slave 31 or the second slave 32 may transmit a response to the first master 11 during the response time.

In operation S31, the slot manager 24 may determine whether the response occurs. When the response occurs, operation S32 may be executed. Otherwise, operation S31 may be maintained.

In operation S32, the slot manager 24 may point the AAP at the oldest slot.

In operation S33, the slot manager 24 may determine whether there is data in the oldest slot. When there is the data in the oldest slot, operation S34 may be executed. Otherwise, operation S35 may be executed.

In operation S34, the slot manager 24 may select the slot. The slot manager 24 may firstly transmit the data stored in the slot to the first master 11.

In operation S35, the slot manager 24 may set the AAP to point at the next slot.

In operation S36, the slot manager 24 may determine whether or not there is data in the pointed slot. When there is the data in the pointed slot, operation S34 may be executed. Otherwise, operation S35 may be executed.

Figures 14A, 14B:
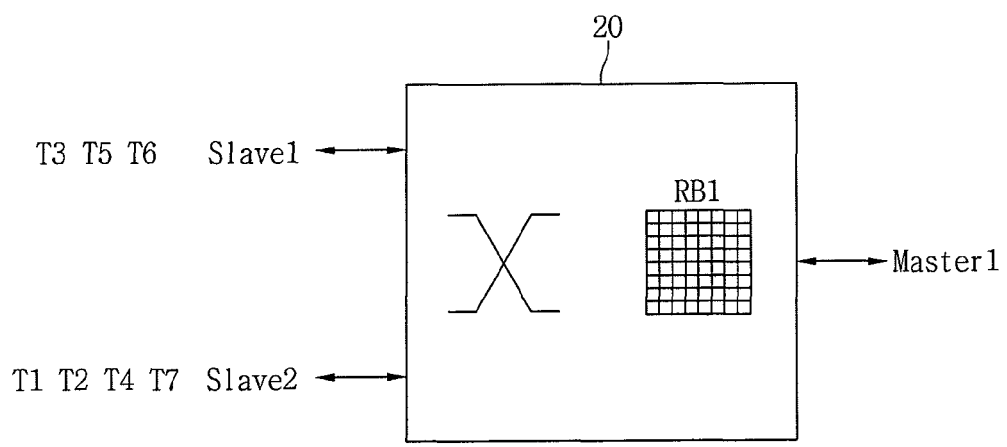
FIG. 14A is a conceptual diagram illustrating operations of a reorder buffer according to an embodiment of the inventive concept.
FIG. 14B illustrates a table showing properties of first through seventh transactions shown in FIG. 14A.

FIG. 14A is a conceptual diagram illustrating operations of a reorder buffer according to an embodiment of the inventive concept.

Referring to FIG. 14A, the first master 11 may access the first slave 31 or the second slave 32 based on the first reorder buffer RB1 in one or more transactions. For example, in the third, fifth, and sixth transactions T3, T5, and T6, the first master 11 may access the first slave 31 based on the first reorder buffer RB1. Also, in the first, second, fourth, and seventh transactions T1, T2, T4, and T7, the first master 11 may access the second slave 32 based on the first reorder buffer RB1.

FIG. 14B illustrates a table showing properties of the first through seventh transactions T1 to T7 shown in FIG. 14A.

Referring to FIG. 14B, the first transaction T1 to the seventh transaction T7 may be executed in a predetermined order. Also, the first through seventh transactions T1 to T7 may have the same transaction ID having a value A. The first transaction T1 may have a burst length of 16. The second transaction T2 may have a burst length of 8. The third transaction T3 may have a burst length of 1. The fourth transaction T4 may have a burst length of 4. The fifth transaction T5 may have a burst length of 1. The sixth transaction T6 may have a burst length of 1. The seventh transaction T7 may have a burst length of 5.

FIG. 14C illustrates a list 25 to which one or more transactions of FIG. 14B are added.

Referring to FIGS. 14A through 14C, it is assumed that outstanding transactions according to embodiments of the inventive concept are in order. That is, the first through seventh transactions T1 to T7 may be sequentially executed and sequentially ended.

The list 25 may include a transaction ID, slave information, occupation, request order, and/or allocated beat counts, and/or the like of each of the first through seventh transactions T1 to T7.

For example, a transaction ID of each of the first through seventh transactions T1 to T7 may have a value A. The first transaction T1 may allow the first master 11 to access the second slave 32. The second transaction T2 may allow the first master 11 to access the second slave 32. The third transaction T3 may allow the first master 11 to access the first slave 31. The fourth transaction T4 may allow the first master 11 to access the second slave 32. The fifth transaction T5 may allow the first master 11 to access the first slave 31. The sixth transaction T6 may allow the first master 11 to access the first slave 31. The seventh transaction T7 may allow the first master 11 to access the second slave 32.

FIG. 15 is a conceptual diagram of a slot array corresponding to the list 25 shown in FIG. 14C.

Referring to FIGS. 14A through 15, each of the first through sixteenth slots slot1 to slot16 included in the slot array 23 may include a plurality of data blocks. Each of the plurality of data blocks in turn may be connected to a linked-list.

The first through seventh transactions T1 to T7 may have the same transaction ID. That is, the transaction ID of the first through seventh transactions T1 to T7 may have a value A. Also, a direction of the first, second, fourth, and seventh transactions T1, T2, T4, and T7 may be the second slave 32, and a direction of the third, fifth, and sixth transactions T3, T5, and T6 may be the first slave 31.

The slot manager 24 may add the first transaction T1 to the list 25. Also, the slot manager 24 may allocate the first transaction T1 to the first slot slot1, which can be a new free slot.

The slot manager 24 may add the second transaction T2 to the list 25. The second transaction T2 cannot share the first slot slot1 to which the first transaction T1 is allocated. This is because the direction of the second transaction T2 is different from the direction of the first transaction T1. Accordingly, the slot manager 24 may allocate the second transaction T2 to the second slot slot2, which can be a new free slot.

The slot manager 24 may add the third transaction T3 to the list 25.

The third transaction T3 cannot share the first slot slot1 to which the first transaction T1 is allocated or the second slot slot2 to which the second transaction T2 is allocated because the third transaction T3 has a different direction than that of the first and second transactions T1 and T2. Accordingly, the slot manager 24 may allocate the third transaction T3 to the third slot slot3, which can be a new free slot.

The slot manager 24 may add the fourth transaction T4 to the list 25. Since the fourth transaction T4 and the second transaction T2 may have the same transaction ID and the same direction, and the second slot slot2 to which the second transaction T2 is allocated has a sufficient free space for allocating the fourth transaction T4, the slot manager 24 may allocate the fourth transaction T4 to the second slot slot2.

The slot manager 24 may add the fifth transaction T5 to the list 25. Since the fifth transaction T5 and the third transaction T3 have the same transaction ID and the same direction, and the third slot slot3 to which the third transaction T3 is allocated has a sufficient free space for allocating the fifth transaction T5, the slot manager 24 may allocate the fifth transaction T5 to the third slot slot3.

The slot manager 24 may add the sixth transaction T6 to the list 25. Since the sixth transaction T6 and the third and fifth transactions T3 and T5 have the same transaction ID and the same direction, and the third slot slot3 to which the third and fifth transactions T3 and T5 are allocated have a sufficient free space for allocating the sixth transaction T6, the slot manager 24 may allocate the sixth transaction T6 to the third slot slot3.

The slot manager 24 may add the seventh transaction T7 to the list 25. The seventh transaction T7 and the second and fourth transactions T2 and T4 may have the same transaction ID and the same direction. However, the second slot slot2 to which the second and fourth transactions T2 and T4 are allocated may not have a sufficient free space for allocating the seventh transaction T7. Accordingly, the slot manager 24 may allocate at least part of the seventh transaction T7 to the second slot slot2, and the remaining part of the seventh transaction T7 may be allocated to the fourth slot slot4, which can be a new slot.

For example, it can be assumed that the seventh transaction T7 has a burst length of 5. The second slot slot2 may have a burst length of 16. The second transaction T2 may have 8 beat counts, and the fourth transaction T4 may have four beat counts. Accordingly, a free space of the second slot slot2 may have four beat counts. Four beat counts T7 (1 to 4) of the seventh transaction T7 may be stored in the free space of the second slot slot2, and the remaining beat count T7(5) of the seventh transaction T7 may be stored in the fourth slot slot4, which can be a new slot. This is because the third slot slot3 has sufficient free space for storing data corresponding to the seventh transaction T7. However, the seventh transaction T7 may have a different direction than each of the third, fifth, and sixth transactions T3, T5, and T6 allocated to the third slot slot3.

In some embodiments, each of the first through sixteenth slots slot1 to slot16 may include 16 data blocks. Each of a plurality of data blocks may be connected to a linked-list. That is, each of the data T7(1 to 4) of the seventh transaction T7 stored in the free space of the second slot slot2 and the data T7(5) of the seventh transaction T7 stored in the fourth slot slot4 may be connected to the linked-list. Accordingly, when the data T7(1 to 4) of the seventh transaction T7 stored in the free space of the second slot slot2 is transmitted, the data T7(5) of the seventh transaction T7 stored in the fourth slot slot4 may also be transmitted.

In the above-described method, the slot manager 24 may utilize all free spaces of the respective slots.

Figure 16:
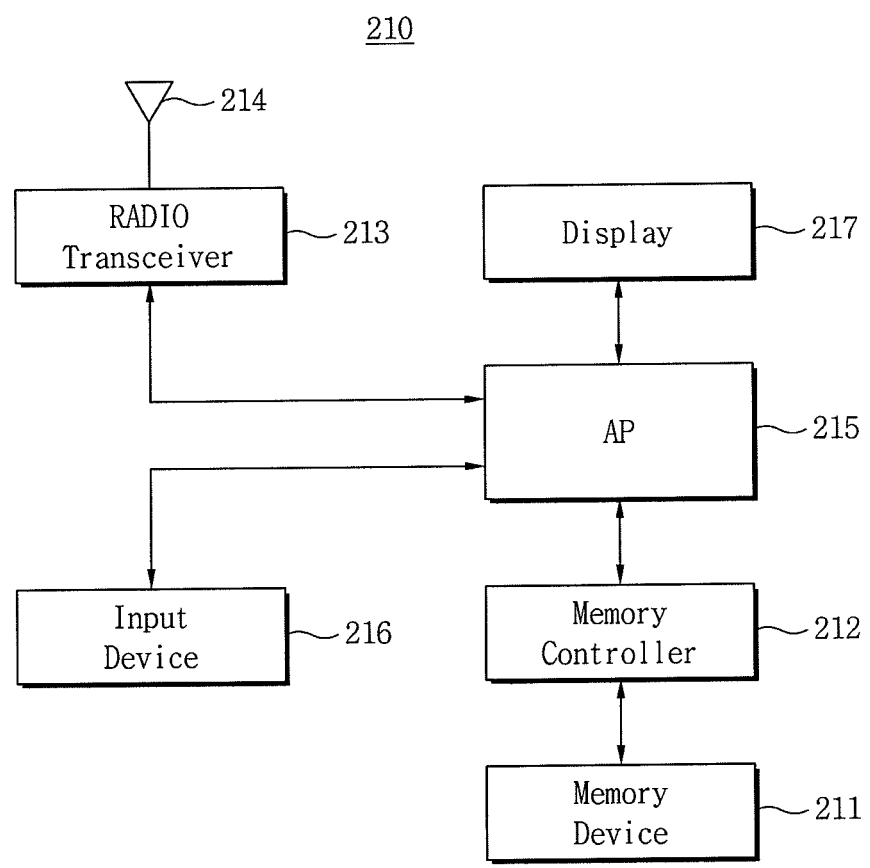
FIG. 16 is a diagram of a computer system including the SOC shown in FIG. 1, according to embodiments of the inventive concept.

FIG. 16 is a diagram of a computer system 210 including the SOC 100 shown in FIG. 1, according to embodiments of the inventive concept.

Referring to FIG. 16, the computer system 210 may include a memory device 211, a memory controller 212 configured to control the memory device 211, a radio transceiver 213, an antenna 214, an application processor (AP) 215, an input device 216, and a display device 217.

The radio transceiver 213 may transmit or receive wireless signals via the antenna 214. For example, the radio transceiver 213 may convert a wireless signal received through the antenna 214 into a signal that may be processed by the AP 215.

Accordingly, the AP 215 may process a signal output by the radio transceiver 213 and transmit the processed signal to the display device 217. Also, the radio transceiver 213 may convert a signal output by the AP 215 into a wireless signal and output the converted wireless signal to an external apparatus through the antenna 214.

The input device 216 may be a device capable of inputting a control signal for controlling operations of the AP 215 or data to be processed by the AP 215. The input device 216 may be embodied as a pointing device such as a touchpad and/or a computer mouse, a keypad, or a keyboard.

In some embodiments, the memory controller 212 capable of controlling operations of the memory device 211 may be embodied as a part of the AP 215 or embodied as a chip provided separately from the AP 215.

In some embodiments, the AP 215 may include the SOC 100 shown in FIG. 1.

Figure 17:
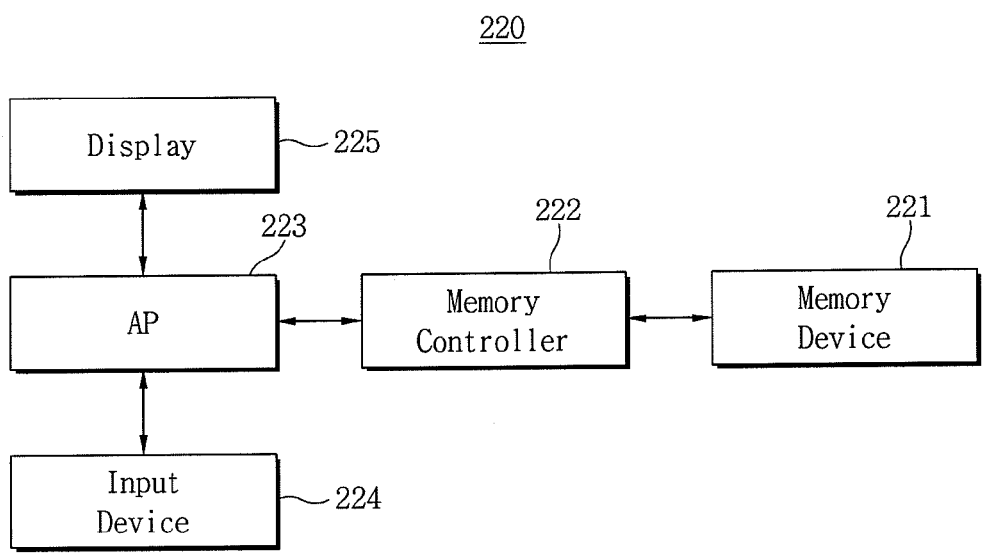
FIG. 17 is a diagram of a computer system including the SOC shown in FIG. 1, according to other embodiments of the inventive concept.

FIG. 17 is a diagram of a computer system 220 including the SOC shown in FIG. 1, according to other embodiments of the inventive concept.

Referring to FIG. 17, the computer system 220 may be embodied as, but not limited to, a personal computer (PC), a network server, a tablet PC, a netbook, an e-reader, a personal digital assistant (PDA), a portable multimedia player (PMP), an MP3 player, or an MP4 player.

The computer system 220 may include a memory device 221, a memory controller 222 capable of controlling data processing operations of the memory device 221, an AP 223, an input device 224, and a display device 225.

The AP 223 may display data stored in the memory device 221 via the display device 225 according to data input via the input device 224. For example, the input device 224 may be embodied as a pointing device (e.g., a touchpad or a computer mouse), a keypad, or a keyboard. The AP 223 may control overall operations of the computer system 220 and control operations of the memory controller 222.

In some embodiments, the memory controller 222 is capable of controlling operations of the memory device 221, and may be embodied as a part of the AP 223 or embodied as a chip provided separately from the AP 223.

In some embodiments, the AP 223 may include the SOC 100 shown in FIG. 1.

Figure 18:
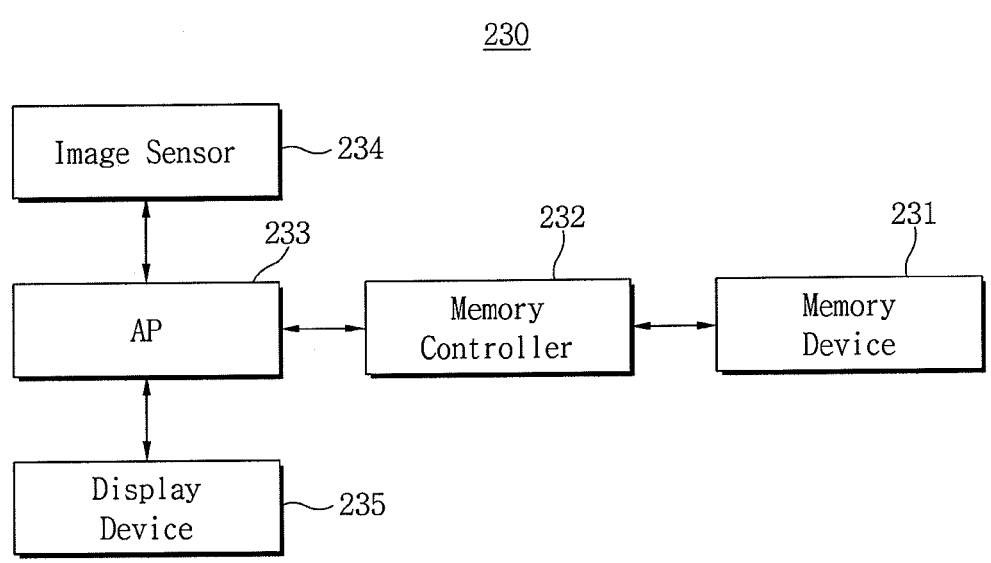
FIG. 18 is a diagram of a computer system including the SOC shown in FIG. 1, according to other embodiments of the inventive concept.

FIG. 18 is a diagram of a computer system 230 including the SOC 100 shown in FIG. 1.

Referring to FIG. 18, the computer system 230 may be embodied as an image processing device, for example, a digital camera or a mobile phone, smartphone, or tablet to which a digital camera is attached.

The computer system 230 may include a memory device 231 and a memory controller 232 capable of controlling data processing operations of the memory device 231, for example, a write operation or a read operation. Also, the computer system 230 may include an AP 233, an image sensor 234, and a display device 235.

The image sensor 234 of the computer system 230 may convert an optical image into digital signals. The converted digital signals may be transmitted to the AP 233 or the memory controller 232. The AP 233 may provide control so that the converted digital signals may be displayed via the display device 235 and/or stored in the memory device 231 through the memory controller 232.

In addition, data stored in the memory device 231 may be displayed via the display device 235 under control of the AP 233 or the memory controller 232.

In some embodiments, the memory controller 232 is capable of controlling the operations of the memory device 231, and may be embodied as a part of the AP 233 or embodied as a chip provided separately from the AP 233.

In some embodiments, the AP 233 may include the SOC 100 shown in FIG. 1.

Embodiments of the inventive concept can be applied to an SOC and a computer system including the same.

An SOC according to embodiments of the inventive concept can increase outstanding capability and exhibit excellent performance.

The foregoing is illustrative of embodiments and is not to be construed as limiting thereof. Although a few embodiments have been described, those skilled in the art will readily appreciate that many modifications are possible without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures.

What is claimed is:

1. A system interconnection comprising:
a reorder buffer, comprising:
a slot array including a first slot; and
a slot manager configured to add a first transaction to a list, allocate the first transaction to the first slot, determine whether a second transaction is redundant, add the second transaction to the list in response to a determination that the second transaction is redundant, and allocate the second transaction to the first slot.

2. The system interconnection of claim 1, wherein in response to a determination that the second transaction is redundant, the first and second transactions are determined to have the same transaction identification (ID) and the same direction, and a slot length of the first slot is greater than or equal to the sum of burst lengths of the first and second transactions.

3. The system interconnection of claim 1, wherein in response to a determination of the second transaction not redundant, the second transaction is allocated to a second slot included in the slot array.

4. The system interconnection of claim 1, wherein the list stores properties of each of the first and second transactions, and wherein the properties of the each of the first and second transactions include a transaction ID, direction information, an occupation, a request order, and allocated beat counts.

5. The system interconnection of claim 1, wherein the slot array includes a global queue configured to store the request order of the first and second transactions.

6. The system interconnection of claim 2, wherein the first slot stores data corresponding to each of the first and second transactions.

7. The system interconnection of claim 3, wherein the first slot stores data corresponding to the first transaction, and the second slot stores data corresponding to the second transaction.

8. The system interconnection of claim 5, wherein the global queue includes a pointer configured to point at the oldest transaction.

9. A system-on-chip (SOC) comprising:
a master;
a slave; and
a system interconnection configured to connect the master and the slave,
wherein the system interconnection comprises:
a reorder buffer, comprising:
a slot array including a first slot; and
a slot manager configured to add a first transaction to a list, allocate the first transaction to the first slot, determine whether a second transaction is redundant, add the second transaction to the list in response to a determination that the second transaction is redundant, and allocate the second transaction to the first slot.

10. The SOC of claim 9, wherein in response to a determination that the second transaction is redundant, the first and second transactions have the same transaction ID and the same direction, and a slot length of the first slot is greater than or equal to the sum of burst lengths of the first and second transactions, and
the first slot stores data corresponding to each of the first and second transactions.

11. The SOC of claim 9, wherein in response to a determination that the second transaction is not redundant, the second transaction is allocated to a second slot included in the slot array, the first slot stores data corresponding to the first transaction, and the second slot stores data corresponding to the second transaction.

12. The SOC of claim 9, wherein the slot manager is constructed and arranged to allocate a larger number of transactions than a number of first slots or second slots.

13. The SOC of claim 9, wherein each of the first and second transactions includes a request made by the master and a response made by the slave.

14. The SOC of claim 9, wherein the slot array includes a global queue configured to store request orders of the first and second transactions, and
the global queue includes a pointer configured to point at the oldest transaction.

15. The SOC of claim 11, wherein in response to a determination that there is no slot to allocate transactions, the system interconnection is in a deadlock state.

16. A system interconnection of a system on chip (SOC), the system interconnection comprising:

a first connector for communicating with at least one master of the SOC;

a second connector for communicating with at least one slave of the SOC; and a reorder buffer, comprising:

a slot array including a plurality of slots; and a slot manager configured to allocate a plurality of transactions to each slot of the plurality of slots in the slot array and determine whether the transactions are redundant, the slot manager including a list configured to correspond to the slots, and further configured to store the transactions and properties thereof, the slot manager configured to control data to be transmitted to the at least one master according to the order of the transactions.

17. The system interconnection of claim 16, wherein the slot manager is configured to add a first transaction to a list, allocate the first transaction to a first slot of the plurality of slots, add a second transaction to the list in response to a determination that the second transaction is redundant, and allocate the second transaction to the first slot.

18. The system interconnection of claim 17, wherein in response to a determination that the second transaction is redundant, the first and second transactions are determined to have the same transaction identification (ID) and the same direction, and a slot length of the first slot is greater than or equal to the sum of burst lengths of the first and second transactions.

19. The system interconnection of claim 17, wherein in response to a determination of the second transaction not redundant, the second transaction is allocated to a second slot included in the slot array.

20. The system interconnection of claim 19, wherein the first slot stores data corresponding to the first transaction, and the second slot stores data corresponding to the second transaction.

* * * * *